US007438346B1

(12) United States Patent
Breed

(10) Patent No.: US 7,438,346 B1
(45) Date of Patent: Oct. 21, 2008

(54) METHOD AND APPARATUS FOR CONTROLLING A VEHICLE DOOR

(75) Inventor: David S. Breed, Boonton Township, Morris County, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 13 days.

(21) Appl. No.: 11/230,150

(22) Filed: Sep. 19, 2005

Related U.S. Application Data

(63) Continuation-in-part of application No. 10/657,547, filed on Sep. 8, 2003, now abandoned, which is a continuation-in-part of application No. 10/397,950, filed on Mar. 26, 2003, now Pat. No. 6,928,694, and a continuation-in-part of application No. 10/043,556, filed on Jan. 11, 2002, now Pat. No. 6,681,444, which is a continuation-in-part of application No. 09/576,065, filed on May 22, 2000, now Pat. No. 6,349,448, which is a continuation of application No. 09/040,206, filed on Mar. 17, 1998, now Pat. No. 6,065,185.

(60) Provisional application No. 60/040,977, filed on Mar. 17, 1997, provisional application No. 60/409,756, filed on Sep. 11, 2002.

(51) Int. Cl.
*B60J 5/00* (2006.01)

(52) U.S. Cl. .............................. 296/146.4; 296/146.12; 296/155

(58) Field of Classification Search ................. 296/155, 296/146.4, 146.12
See application file for complete search history.

(56) References Cited

U.S. PATENT DOCUMENTS

| | | | |
|---|---|---|---|
| 406,840 | A | 7/1889 | Jones |
| 2,232,986 | A | 2/1941 | Westrope |
| 2,268,976 | A | 1/1942 | Westrope |
| 2,268,977 | A | 1/1942 | Westrope |
| 2,882,548 | A | 4/1959 | Roethel |
| 2,992,451 | A | 7/1961 | Schonitzer et al. |

(Continued)

FOREIGN PATENT DOCUMENTS

| | | |
|---|---|---|
| CA | 614441 | 2/1961 |

(Continued)

OTHER PUBLICATIONS

D.J. Bak, "Sprag Design Adds New Dimension", Design News, Mar. 3, 1997, p. 130.

*Primary Examiner*—Dennis H Pedder
(74) *Attorney, Agent, or Firm*—Brian Roffe

(57) ABSTRACT

Vehicle including a door frame alongside a position in a passenger compartment of the vehicle normally occupied by a driver, a driver door having a first, closed position arranged in the door frame and a second, fully open position outside of the door frame, and an infinite door check mechanism which enables the door to be moved between the first and second positions and to any open position therebetween. The infinite door check mechanism includes a motor arranged to move the door between the first and second positions and to any of the open positions therebetween. A control mechanism controls the motor to initiate movement of the door and stop the movement when the door is in any one of the different open positions and maintain the door in the stopped position in the absence of applied force to hold the door in the stopped position.

28 Claims, 16 Drawing Sheets

U.S. PATENT DOCUMENTS

| | | | | |
|---|---|---|---|---|
| 3,345,680 | A | 10/1967 | Slattery | |
| 3,461,481 | A | 8/1969 | Bachmann | |
| 3,584,333 | A | 6/1971 | Hakala | |
| 3,643,289 | A | 2/1972 | Lohr | |
| 3,965,531 | A | 6/1976 | Fox et al. | |
| 3,969,789 | A | 7/1976 | Wize | |
| 4,069,547 | A | 1/1978 | Guionie et al. | |
| 4,332,056 | A | 6/1982 | Griffin et al. | |
| 4,532,675 | A | 8/1985 | Salazar | |
| 4,628,568 | A | 12/1986 | Lee et al. | |
| 4,720,895 | A | 1/1988 | Peebles | |
| 4,995,194 | A | 2/1991 | Schultze et al. | |
| 5,018,243 | A | 5/1991 | Anspaugh et al. | |
| 5,027,552 | A | 7/1991 | Miller et al. | |
| 5,074,010 | A | 12/1991 | Gignac et al. | |
| 5,173,991 | A | 12/1992 | Carswell | |
| 5,346,272 | A | 9/1994 | Priest et al. | |
| 5,452,501 | A | 9/1995 | Kramer et al. | |
| 5,468,042 | A | 11/1995 | Heinrichs et al. | |
| 5,474,344 | A | 12/1995 | Lee | |
| 5,481,830 | A | 1/1996 | Gooding et al. | |
| 5,482,144 | A | 1/1996 | Vranish | |
| 5,531,498 | A | 7/1996 | Kowall | |
| 5,878,530 | A | 3/1999 | Eccleston et al. | |
| 5,982,126 | A | 11/1999 | Hellinga et al. | |
| 5,986,420 | A | 11/1999 | Kato | |
| 6,134,837 | A | 10/2000 | Kawanobe et al. | |
| 6,142,551 | A | 11/2000 | Ciavaglia et al. | |
| 6,199,322 | B1 | 3/2001 | Itami et al. | |
| 6,226,925 | B1 | 5/2001 | Shimura et al. | |
| 6,305,737 | B1 * | 10/2001 | Corder et al. | 296/146.11 |
| 6,339,305 | B1 | 1/2002 | Ishihara et al. | |
| 6,516,495 | B1 | 2/2003 | Michalak | |
| 6,588,829 | B2 | 7/2003 | Long et al. | |
| RE38,400 | E | 1/2004 | Kowall et al. | |
| 6,676,186 | B2 | 1/2004 | Greif | |
| 6,681,444 | B2 | 1/2004 | Breed et al. | |
| 6,793,268 | B1 * | 9/2004 | Faubert et al. | 296/146.12 |
| 2006/0061135 | A1 * | 3/2006 | Oxley et al. | 296/155 |

FOREIGN PATENT DOCUMENTS

| | | |
|---|---|---|
| GB | 833844 | 5/1960 |

* cited by examiner

METHOD AND APPARATUS FOR CONTROLLING A VEHICLE DOOR

CROSS-REFERENCE TO RELATED APPLICATIONS

This application is a continuation-in-part of U.S. patent application Ser. No. 10/657,547 filed Sep. 8, 2003 which is:

1) a continuation-in-part of U.S. patent application Ser. No. 10/397,950 filed Mar. 26, 2003, now U.S. Pat. No. 6,928,694;

2) a continuation-in-part of U.S. patent application Ser. No. 10/043,556 filed Jan. 11, 2002, now U.S. Pat. No. 6,681,444, which is a continuation-in-part of U.S. patent application Ser. No. 09/576,065 filed May 22, 2000, now U.S. Pat. No. 6,349, 448, which is a continuation of U.S. patent application Ser. No. 09/040,206 filed Mar. 17, 1998, now U.S. Pat. No. 6,065, 185, which claims priority under 35 U.S.C. §119(e) of U.S. provisional patent application Ser. No. 60/040,977 filed Mar. 17, 1997; and 3) claims priority under 35 U.S.C. §119(e) of U.S. provisional patent application Ser. No. 60/409,756 filed Sep. 11, 2002.

All of the above-mentioned applications are incorporated by reference herein in their entirety.

FIELD OF THE INVENTION

The present invention relates to opening, closing and/or holding devices, systems and methods for controlling doors and more particularly to holding devices for the doors of vehicles and most particularly for automobile and truck doors and the like. Door holding devices of the kind provided by this invention are often referred to as infinite-position holding devices or infinite position door checks because they act to hold the door in any open position to which it is moved and left standing, but still permit the door to be readily moved to any other desired position.

The present invention also relates to a motorized door of a vehicle.

BACKGROUND OF THE INVENTION

A door check mechanism is usually present on each vehicle door on all automobiles, recreational vehicles, vans, trucks, and virtually all other vehicles. In many designs, the door check mechanism provides two open detented positions, one at which the door is partially open and the other at which the door is fully open. In some cases, the door check mechanism for a vehicle door provides only one open retention position.

Door check mechanisms of the fixed detent type are quite common and have been used for many years. However, they are far from uniform in construction or in application. In many vehicles, the manufacturer provides a check mechanism that is separate from the door hinges and it is typically mounted at a location midway between the two hinges. In other instances, one of the hinges incorporates a check mechanism in the hinge structure itself.

Attempts have been made to incorporate an infinite door check mechanism into a vehicle and a number of patents have been issued covering such devices (discussed below). None has yet achieved commercial success due to the cost and complexity and well as the short service lives of these prior art mechanisms.

Door check mechanisms have in general exhibited some substantial difficulties over the years including: (i) the need in some designs for frequent lubrication without which they tend to make undesirable noises; (ii) inadequate operating life; (iii) corrosion; (iv) the inability to endure vehicle body processing temperatures associated with the curing of external finishes (400° F.); (v) the inability to be easily separated from the vehicle after painting to permit the door to be separately trimmed and then reassembled to the body; (vi) the occurrence of unacceptable stress and wear on the door hinges caused by loading from the door check; and (vii) the requirement for frequent post installation adjustment during the vehicle life. Each of these problems has been addressed in one or more of the prior art fixed detent door checks but there is no infinite door check that has solved all of these problems.

The tendency for an automobile door to swing open or closed when not desired is frequently caused by factors such as the transverse curvature or crown of a pavement or road, by the slope of a hill, or by a gust of wind. Such a tendency, when in the closing direction, causes the door to strike the legs or other parts of a person entering or leaving the automobile. When in the opening direction, it can cause the door to impact into other people or objects inflicting harm or damage thereto. A particularly costly problem, as reported by automobile insurance companies, happens in parking lots where the opening door of one vehicle bangs into an adjacent vehicle causing damage to the finish that can lead to an insurance claim. This increases the cost of insurance to all automobile owners.

To partially solve this problem, vehicle doors are frequently provided with an inclined hinge axis incident to body design that biases the door to close. This is a desirable feature since it aids in the closing of the door especially by older or physically impaired people and should not be defeated as is done by some infinite position door checks which maintain a friction drag on the vehicle door at all times.

As discussed below, this tendency of a vehicle door to swing in an unwanted manner is prevented or minimized by the infinite door check means of the present invention which is effective to hold the door in any open position in which it is left standing, while permitting a relatively free manual movement of the door to any other desired position and a free self closing action when that is desired. This invention also provides an infinite position door checking mechanism that solves all of the problems of prior art infinite position door checks listed above in a simple and cost effective design. In the context of automobile manufacturing, for example, most of the design implementations of this invention permit the door to be easily removed from the vehicle for trimming and then reassembled entailing only the removal and replacement of a single pin.

The infinite position door check mechanism for regulating pivotal movement of a vehicle door between a closed position and any open position, which mechanism is sometimes incorporated in a hinge, includes an elongated strip member having a flat or curved surface; a cam, or other locking member, which engages one of the strip surfaces with varying amounts of pressure contact depending on whether the door is in the freely opening or closing mode, checked against movement in one direction or checked against movement in both directions. Either the cam or the strip member typically has a resilient plastic, brake material or other non-metallic surface, the other surface generally being metal. The engaging portions of the cam and strip member surfaces are thus preferably dissimilar materials, usually a metal and a non-metal.

Pertinent prior art to infinite position door check mechanisms includes the following:

U.S. Pat. No. 406,840 to Jones describes a door check for doors of buildings and like structures and includes a check-rod and a sliding sleeve containing two springs between which the check-rod is fitted. The springs bear or press constantly on opposite sides of the check-rod, and when they ride over inclined surface of the rod at a point of its greater diameter, they are compressed and serve to retard rapid movement of the door.

U.S. Pat. No. 2,232,986 to Westrope describes a door check device having a check arm provided with spaced abutments providing a recess therebetween. The check device includes a retainer through which the arm extends and a pair of bearings in the retainer for engaging opposite sides of the arm and having socket-engaging portions. The bearing members are movable away from each other so that one of the abutments may pass therebetween. The socket-engaging portions engage that abutment when the bearing members are positioned in the recess. Yieldable means are provided to hold the bearing members in engagement with opposite sides of the arm.

U.S. Pat. No. 2,268,976 to Westrope describes a door check for a vehicle including an arm pivoted to either the door or the vehicle supporting structure. The arm has a projection and a cushion thereon. The projection is adapted to engage a tiltable cam mounted upon the other structure and supported upon a resilient member. When the door is opened, the projection engages the cam and pushes it downward as the projection slips over the cam. Thereafter, the cushion on the arm engages the housing of the cam and cushions the halting motion of the door. After the projection on the arm has slipped over the cam, the cam acts as a yielding abutment to hold the door open.

U.S. Pat. No. 2,268,977 to Westrope describes a door check for a vehicle including a housing attached to the body of the vehicle and a strap or link attached to the door or vice versa. The housing contains a tiltable cam engageable with a projection on the strap or link and having a spring member for maintaining this engagement. Optional means are provided for adjusting the tension of the spring member.

U.S. Pat. No. 2,882,548 to Roethel is one of the early patents on door checks. The checking is done by friction drag that is increased at two checking positions. The effectiveness of this system is degraded when the coefficient of friction changes, and the system has a limited life.

U.S. Pat. No. 2,992,451 to Schonitzer et. al. describes a design that uses continuous sliding friction of a nylon plunger spring loaded against a ramp member. Some viscoelastic effect, or static/dynamic friction, takes place when the door is held in a particular position slightly increasing the resistance to further motion. Problems arise with regard to dirt, moisture, temperature, wearing etc. This may be the first infinite door check patent. The holding power is stronger when the door is in the open position. The continuous friction defeats the automatic door closing system. The holding force is designed to exactly counter-balance the tendency of the door to close by itself. The system is also dependent on sliding friction and therefore strongly affected by the surface condition that may have a coating of oil, grease, moisture etc. or be dry.

U.S. Pat. No. 3,345,680 to Slattery describes a friction type door checking device that is designed to hold the door in discrete positions. It has the same problems as Schonitzer et al.

U.S. Pat. No. 3,461,481 to Bachmann describes an infinite position door checking device based on a frictional locking mechanism. The frictional locking mechanism is held in contact with the friction surfaces by means of a biasing spring that exerts its maximum torque and thus creates the maximum wear when the mechanism is in the unlocked position.

U.S. Pat. No. 3,584,333 to Hakala describes an infinite position door check system in which a contact edge of the detent member digs into the friction member to provide a wedging restraint to hold the door. It is thus a friction-based system. The torque spring has its maximum force in the non-detented positions, thus, maximum drag. The system requires careful alignment and is subject to wear. Thus the characteristics will change over time. It does not have an intermediate detenting position. The normal tendency of the door to close under gravity causes the detenting action. The frictional drag works to prevent the door from closing under its own weight thus defeating that desirable function.

U.S. Pat. No. 3,643,289 to Lohr describes a device including an infinite position hold open hinge. This device is a totally sliding friction dominated system using a plastic brake. A greater force is required to close the door than is required to open the door. There is drag on the door in both directions and higher drag in the closing direction. The brake is made of a material such as nylon or polyurethane that the inventor claims has both a high static coefficient of friction and low sliding coefficient of friction. Although this is the goal, this cannot be achieved due to surface contamination.

U.S. Pat. No. 3,969,789 to Wize describes a system with four detents thus providing multiple locations for the door. The detenting mechanism slides smoothly over the detents as long as torque is applied to the door. When motion is stopped, the detent falls into the closest spot. This may cause significant motion of the door to get to the nearest door detent. There also is an alignment problem with this device. The detenting is done with rollers, however, so there is no sliding friction except for the friction spring associated with the mechanism that carries the detents over the detenting holes or slots.

U.S. Pat. No. 3,965,531 to Fox et al. describes an infinite position door hold open using continuous sliding friction to wedge a brake to create a much larger friction. The device is complicated, requires adjustment, is sensitive to dirt, and has no positive intermediate position. Thus, as with all other infinite door checks discussed thus far, the door is either in a position where it will move relatively easily toward a more open position but is checked against closing or else it is in a position where it will move freely toward the closed position but is checked against opening. The friction surfaces are knurled and adjustment is required during the life of the vehicle due to wear of brake surfaces.

U.S. Pat. No. 4,069,547 to Guionie et. al. describes a device using a four-bar linkage structure that has the advantage of keeping the detenting system aligned. Otherwise, it is a single position door checking mechanism. The checking motion is rather small, probably resulting in significant variation in the checked position from vehicle to vehicle.

U.S. Pat. No. 4,332,056 to Griffin et. al. describes an infinite position door check that does not have an intermediate position. It uses a roller that rubs continuously on the friction surface resulting in a wear problem. It can also defeated by moisture, oil, or other contaminant etc. on the rubbing surfaces. For this reason, the hard rubber chosen as the friction surface is a poor choice since the friction coefficient is strongly influenced by surface films. The roller moves from one position to another based on differences in the friction coefficients between the biasing plunger and the hard rubber coated arcuate friction surface. This system requires adjustment when installing on vehicle.

U.S. Pat. No. 4,532,675 to Salazar describes a door hold open door check which is only engaged when the door is in the fully open position. Therefore, the parts are not under continual cyclical stress as which reduces the wear problem.

U.S. Pat. No. 4,628,568 to Lee et. al. describes an infinite position door check system based on a difference between a high static coefficient of friction and low sliding coefficient of friction such as nylon or polyurethane. This is unsustainable as surface films will radically change the friction coefficients. Since significant friction is always present, there is a wear problem resulting in a device with a short life without adjustment.

U.S. Pat. No. 4,720,895 to Peebles describes a quick disconnect door hinge with an integral discrete position door check. It solves the problem of being able to paint the door on the body and then disassembling it for trimming and later reassembling it to the vehicle in an easy manner.

U.S. Pat. No. 5,018,243 to Anstaugh et al. describes the use of a polyester urethane material for coating the roller. This material is good from −40° to 400° F. and lasts substantially longer than nylon if it is backed up by metal. Additionally, it is substantially quieter than the nylon on metal system used in the prior art.

U.S. Pat. No. 5,074,010 to Gignac et al. describes a detent system and shows the many different geometries that have been adopted by various vehicle manufacturers. It claims advantages in either the roller or the track having a resilient elastomer core, preferably an elastomer material (e.g., a silicone polymer) that retains its elastic properties over a wide temperature range.

U.S. Pat. No. 5,173,991 to Carswell addresses some of the force components that can cause noise and premature failure of door check mechanisms. The design described in this patent is a discrete door check that is claimed to be quite and have a long life. Once again, the contacting materials are discussed and this patent recommends coating the link arm with Milon by DuPont that is moldable material. The bearing ball purportedly provides three degrees of freedom where as the prior art devices with rollers allow for only two degrees of freedom with the result of a fair amount of grinding of the housing adjacent the edges or shoulders of the link member. The ball system gives point contact, therefore higher forces and therefore greater wear. It has not been realized that this problem can and has been solved in prior art devices by placing the rollers with their axes in a vertical direction. Although the ball rolls in the groove, on which the patent makes a great issue, it is sliding on the elastomeric spring that pushes it down. This sliding friction will cause wear and shorten the life of the door check.

U.S. Pat. No. 5,346,272 to Priest et al. describes a door hinge with infinitely adjustable detent or door check. It is significant since it is the first attempt to apply electronics to this problem. There is no obvious advantage to this overly complicated system since to deactivate the door holding system, the door must be moved which requires a force. The same force can be used to remove the detent in a pure mechanical system.

U.S. Pat. No. 5,452,501 to Kramer et al. describes a device in which the detent force acts vertically so as to not load the pivot pin. However, in this case, the hinge pin is still loaded when the door is moved into and out of the detented positions and thus the problem is only partially solved. Any detenting system will put a couple onto the hinge pin.

U.S. Pat. No. 5,474,344 to Lee describes a device which is almost a duplicate of the Carswell patent (U.S. Pat. No. 5,173,991) except rollers are used instead of balls. In this patent, the body as well as the cover are all made from plastic. Significantly, there is a pad disclosed for the prevention of the introduction of foreign substances into the locking unit.

Although each of the above references attempts to solve one or more of the problems listed above, in contrast to the infinite position door check described herein, in no case is there provided an infinite door check mechanism which solves substantially all of these problems. As a result, there is no successful infinite door check in high volume commercial use at this time although the desire for such a device is well known in the industry.

OBJECTS AND SUMMARY OF THE INVENTION

Accordingly, it is an object of the invention to provide new and improved door check mechanisms for regulating movements of a vehicle door, or doors of other structures.

It is another object of the present invention to provide new and improved door mechanisms which enables the door to be moved to a plurality of different open positions and held in those open positions.

It is still another object of the present invention to provide new and improved door check mechanisms which provide positive retention of the vehicle door in an infinite number of open positions without interfering with the normal opening and closing movements of the doors, yet exhibit long life and are essentially unaffected by high or low temperatures.

Further objects and advantages on this invention include, to provide an infinite position door check mechanism which does not require lubrication; has an operating life equivalent to that of the vehicle; does not corrode; is able to endure vehicle body processing temperatures associated with the curing of external finishes (about 400° F.); is able to be easily separated from the vehicle after painting to permit the door to be separately trimmed and then reassembled to the body; is simple and inexpensive to manufacture and install; does not result in unacceptable stress and wear on the door hinges caused by loading from the door check; does not require post installation adjustment during the vehicle life; and has the capability to be released electrically permitting the vehicle door to close under its own weight.

It is another object of the present invention to provide new and improved motorized swing doors wherein provisions are made to allow the door to be opened manually without damaging the actuating motor.

It is yet another object of the present invention to provide a new and improved motorized swing doors which can be opened by an authorized person from a distance using for example a key or other unique object.

It is still another object of the present invention to provide new and improved doors which are associated with a recognition system capable of recognizing when an authorized person approaches the vehicle and enables the door to be opened upon such recognition.

In order to achieve at least one of these objects, a vehicle in accordance with the invention includes a door frame alongside a position in a passenger compartment of the vehicle normally occupied by a driver, a driver door having a first, closed position arranged in the door frame and a second, fully open position outside of the door frame, and an infinite door check mechanism which enables the driver door to be moved from the first position to the second position and to any one of a plurality of different open positions between the first position and the second position. The infinite door check mechanism includes a motor arranged to move the driver door from the first position to the second position and to any of the plurality of different open positions between the first position and the second position. A control mechanism is provided for controlling the motor to initiate movement of the driver door and stop the movement when the driver door is in any one of the different open positions between the first position and the second position and maintain the driver door in the stopped position in the absence of applied force to hold the driver door in the stopped position. The control mechanism may be a pressure detecting sensor arranged to detect applied pressure and a processor coupled to the pressure detecting sensor to direct the motor to move or cease movement of the driver door based on the detected pressure. The driver door can be movable to any one of a plurality of different laterally open positions in which the space between a lateral edge of the driver door and an edge of the door frame against which the lateral edge of the driver door is positioned when the driver door is situated in the door frame is varied. The sensor can be arranged on the driver door and have a pressure sensitive surface oriented in a direction in which the door moves laterally during the opening movement of the door.

In one embodiment, a gear engages with the motor, a track is arranged in the door frame, a shaft is arranged to be rotated by the gear, and lever arms are coupled to the shaft and arranged to exert a force on the driver door upon rotation of the shaft in order to cause a front edge of the driver door to initially move outward and then forward as a rear edge of the driver door moves in the track. In another embodiment, the driver door is a gull-wing door. In yet another embodiment, the vehicle includes a linkage mechanism of linkages connected to the driver door and arranged to move the driver door upward upon receiving motive power from the motor. In still another embodiment, linkages connect to the driver door and to the motor and are arranged to move the driver door outward from the door frame and then rearward upon receiving motive power from the motor.

A method for enabling a driver door to be opened to any one of a plurality of different positions in accordance with the invention includes mounting the driver door in a door frame, coupling a motor to the driver door, actuating the motor to move the driver door from a closed position in the door frame into any one of a plurality of different open positions, and stopping the movement of the driver door when the driver door is positioned in any one of the plurality of different open positions and maintaining the driver door in the stopped position in the absence of applied force to hold the driver door in the stopped position.

Additionally, the method can include arranging a pressure detecting sensor to detect applied pressure, the movement of the driver door being stopped by applying pressure to the sensor. The driver door is mounted such that the door moves in a lateral direction alongside the door frame during an opening movement of the door, while the motor is actuated to move the driver door from the closed position into any one of a plurality of different laterally open positions in which the space between a lateral edge of the driver door and an edge of the door frame against which the lateral edge of the driver door is positioned when the driver door is situated in the door frame is varied. In this case, the sensor can be arranged on the driver door with a pressure sensitive surface oriented in a direction in which the driver door moves laterally during the opening movement of the driver door.

Another embodiment of a vehicle with a door in accordance with the invention include a door frame, a door mounted in the door frame, an infinite door check mechanism for enabling the door to be moved from a closed position in the door frame to any one of a plurality of different open positions, a motor coupled to the door and arranged to move the door from the closed position to any of the open positions, a pressure sensor arranged on the door and having a pressure sensitive surface oriented in the direction of opening of the door, and a processor coupled to the sensor and directing the motor to stop the opening movement of the door and maintain the door in its stopped position when pressure above a threshold is applied to the pressure sensitive surface of the pressure sensor. The door frame may be situated alongside a position in a passenger compartment of the vehicle normally occupied by a driver in which case, the door is a driver door.

A method for enabling a door to be opened to any one of a plurality of different positions in accordance with the invention includes coupling a motor to the door, arranging a pressure sensor on the door, providing the pressure sensor with a pressure sensitive surface oriented in a direction of opening of the door, actuating the motor to move the door from a closed position into an open position, and directing the motor to stop the opening movement of the door and maintain the door in the stopped position when pressure above a threshold is applied to the pressure sensitive surface of the pressure sensor. The door frame may be situated alongside a position in a passenger compartment of the vehicle normally occupied by a driver in which case, the door is a driver door.

In order to achieve the same or other objects of the invention, a method for controlling a motorized swing door of a vehicle to allow for non-motorized operation in accordance with the invention includes monitoring the torque on the motor or force or torque exerted on the door and disengaging the motor from the door when the torque or force is above a threshold, or satisfies another criteria. Optionally, the velocity of the door can be monitored and the motor re-engaged with the door when the velocity of the door is zero.

An apparatus for controlling a motorized swing door of a vehicle to allow for non-motorized operation in accordance with the invention comprises a motor releasably coupled to the door for opening and closing the door, a torque sensor for measuring the torque on the motor, torque or force on the door, and a processor coupled to the torque sensor and the motor for analyzing the measured torque or force on the motor or door relative to a threshold and disengaging the motor from the door when the torque or force is above the threshold.

A method for controlling opening and closing of a vehicle door in accordance with the invention includes detecting the presence of an individual authorized to open the door and enter the vehicle, generating a signal upon the detection of the presence of an authorized individual or an object possessed by the authorized individual and actuating a motor upon receipt of the signal to open or close the door.

An apparatus for controlling opening and closing of a vehicle door in accordance with the invention includes a sensor for detecting the presence of an individual authorized to open the door and enter the vehicle and a motor coupled to the sensor and the door and arranged to open or close the door upon receipt of a signal from the sensor. The sensor generates a signal upon the detection of the presence of an authorized individual or an object possessed by the authorized individual.

BRIEF DESCRIPTION OF THE DRAWINGS

The invention will be described with reference to the following non-limiting drawings.

DETAILED DESCRIPTION OF PREFERRED EMBODIMENTS

Figure 1:
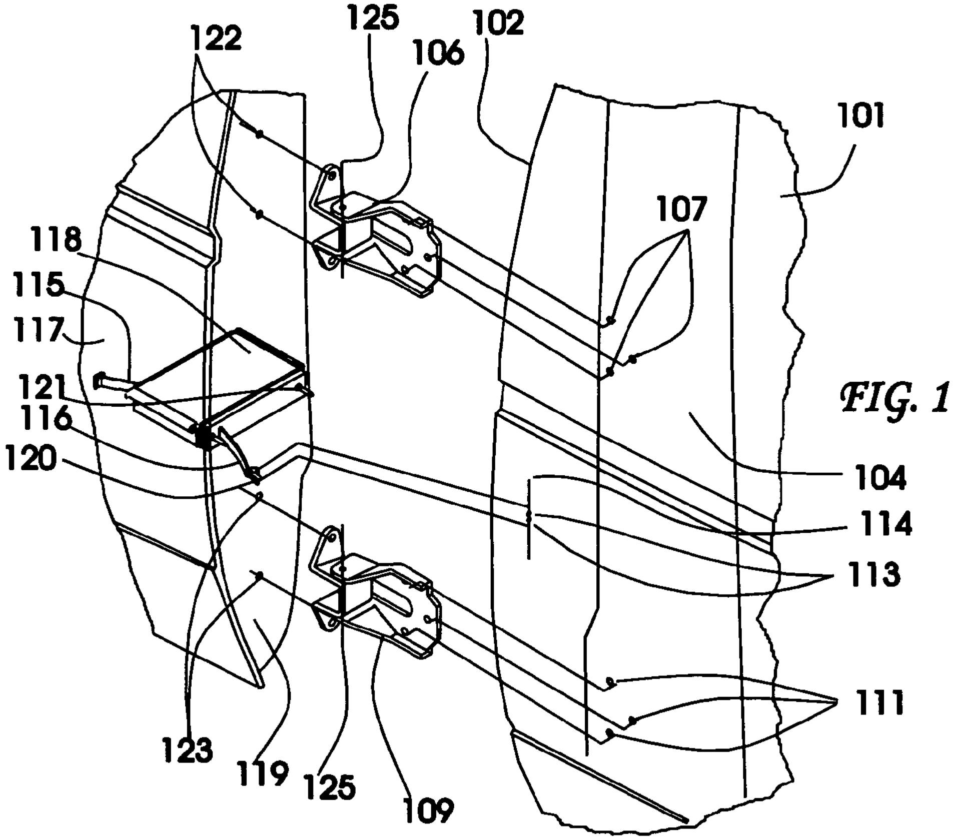
FIG. 1 is a partially exploded perspective view of a vehicle door mounting, employed to describe and illustrate use of a door check mechanism in accordance with the invention.

Referring to the accompanying drawings wherein like reference numerals refer to the same or corresponding parts throughout the several views, FIG. 1 is a partially exploded perspective view of a portion of the side of a vehicle, which could be an automobile or virtually any other kind of vehicle, including a part of a door opening. A portion of the right front side body of the vehicle is shown at the right-hand side and a portion of the door is shown on the left-hand side of FIG. 1 respectively. The edge of the door opening, along the left-hand vertical side of body member 101, is identified by reference numeral 102. Closely adjacent to the edge of the door opening 102, there is a vertical frame member 104, a part of the vehicle frame that may be the A-pillar. The terms vertical frame member and A-pillar are used interchangeably herein although the vertical frame pillar may be other than the A-pillar such as the B-pillar if the door is a rear door of a four door vehicle.

The door portion shown in FIG. 1 includes an upper hinge 106 that includes appropriate mounting means for mounting it on the vertical frame member or A-pillar 104 at a plurality of mounting locations 107, e.g., three mounting locations at which screws or welds are provided. Similarly, there is a second, lower hinge 109 that is fastened to the A-pillar 104 at a plurality of mounting locations such as the mounting locations 111, again by appropriate mounting means such as screws or welds. Additionally, a clevis 120, having a vertical axis 114, is shown mounted on the A-pillar 104 at a plurality of mounting locations 113. The clevis 120 is a part of a door check mechanism 118 comprising one embodiment of the present invention and is described more fully below. The clevis 120 affords a pivotal connection for an elongated strip member 116 that projects outwardly from A-pillar 104 and the clevis 120 toward a door 11 7. Strip member 116 extends through a housing of the door check mechanism 118 that is mounted on door 117. The clevis 120 may be omitted in its entirety and the strip member 116 either rigidly mounted to the A-pillar 104 in some cases, pivotally mounted directly to the A-pillar 104 or flexibly mounted to the A-pillar 104.

Door 117 includes a vertical support member 119 that is preferably an integral part of the door. Door check mechanism 118 is mounted on the support member 119 by fastening means indicated generally as 121. Upper hinge 106 is mounted on door 117, preferably as indicated at mounting locations 122, by fastening means and more particularly on support member 119. Similarly, the lower hinge 109 is mounted on the support member 119 at mounting locations 123 by fastening means. The hinges 106,109 have a common pivotal axis 125 for enabling pivotal movement of the door. The fastening means may be screws, nails, welds, rivets, adhesive, etc.

Figure 2:
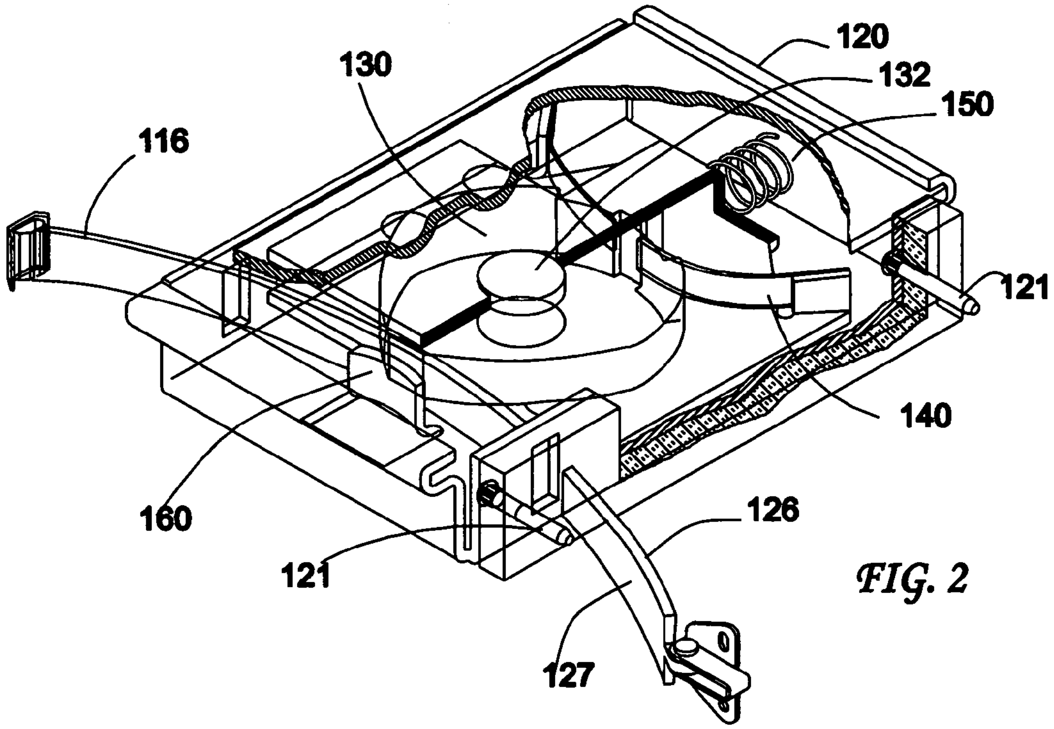
FIG. 2 is a perspective view of a vehicle door check mechanism constructed in accordance with one embodiment of the invention where the door check is separate from the door hinge.
Figure 3:
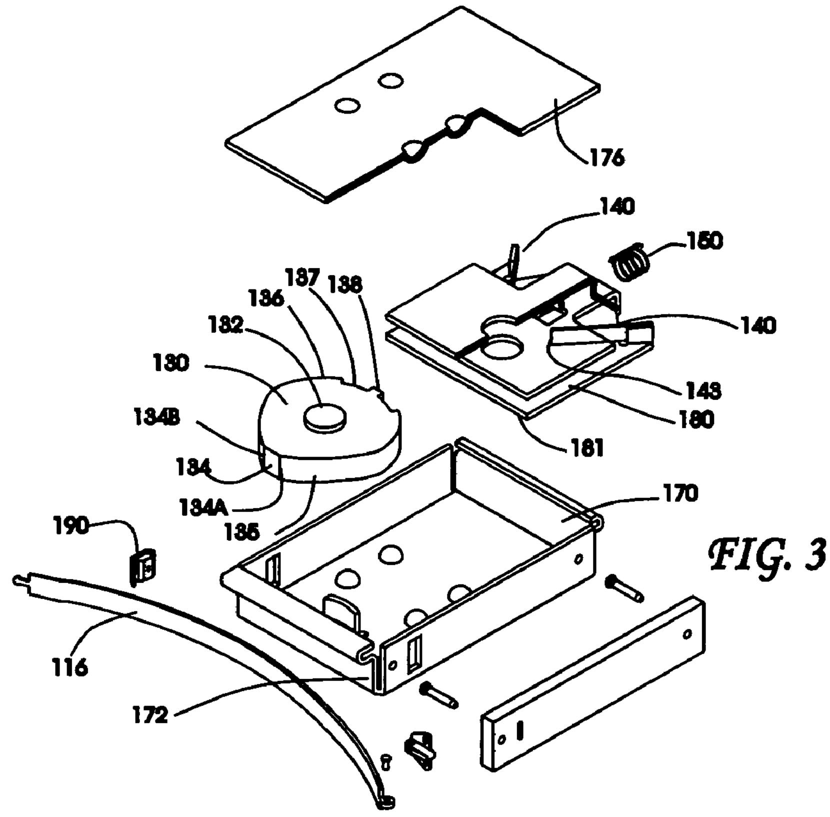
FIG. 3 is an exploded perspective view of the door check mechanism of FIG. 2.

In one preferred form of the door check mechanism 118 that is shown in FIGS. 2-5, strip member 116 is arcuate and has two opposed, longitudinally extending flat surfaces 126 and 127. A locking member such as a locking cam 130 is arranged in a housing 170 of door check mechanism 118 and has an integral cam shaft 132 and a profile around its circumference composed of sections 134, 135, 136, 137 and 138, each of which will now be described (FIG. 3). The cam 130 interacts with the strip member 116 pressing it against a support member 160 with varying amounts of force depending on the rotational position of the cam 130.

Figure 4A:
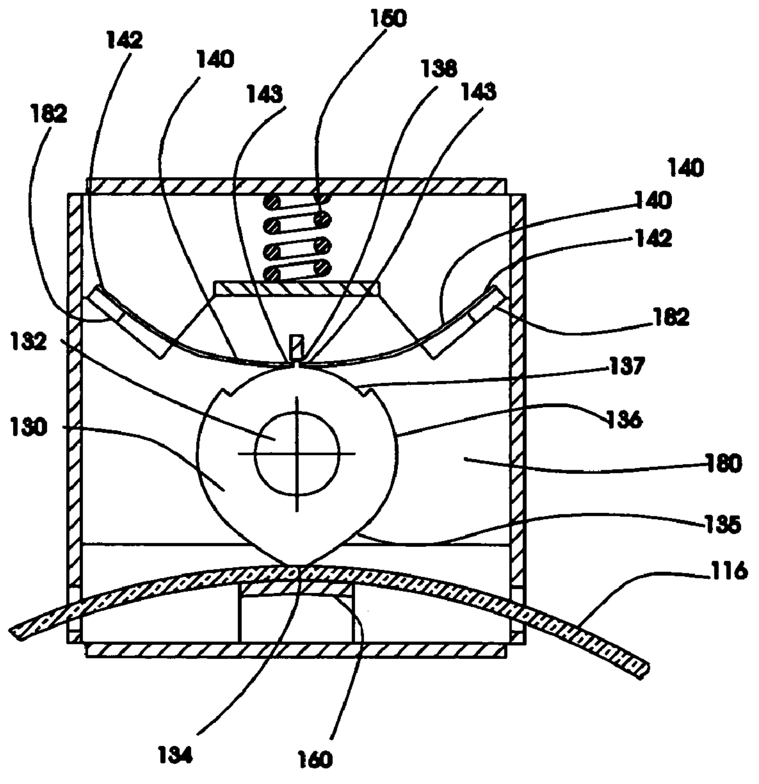
FIG. 4A is a view of the cam and strip member illustrating the mechanism in the detenting position where the cam opposes motion of the strip member in either the door opening or door closing directions.
Figure 5:
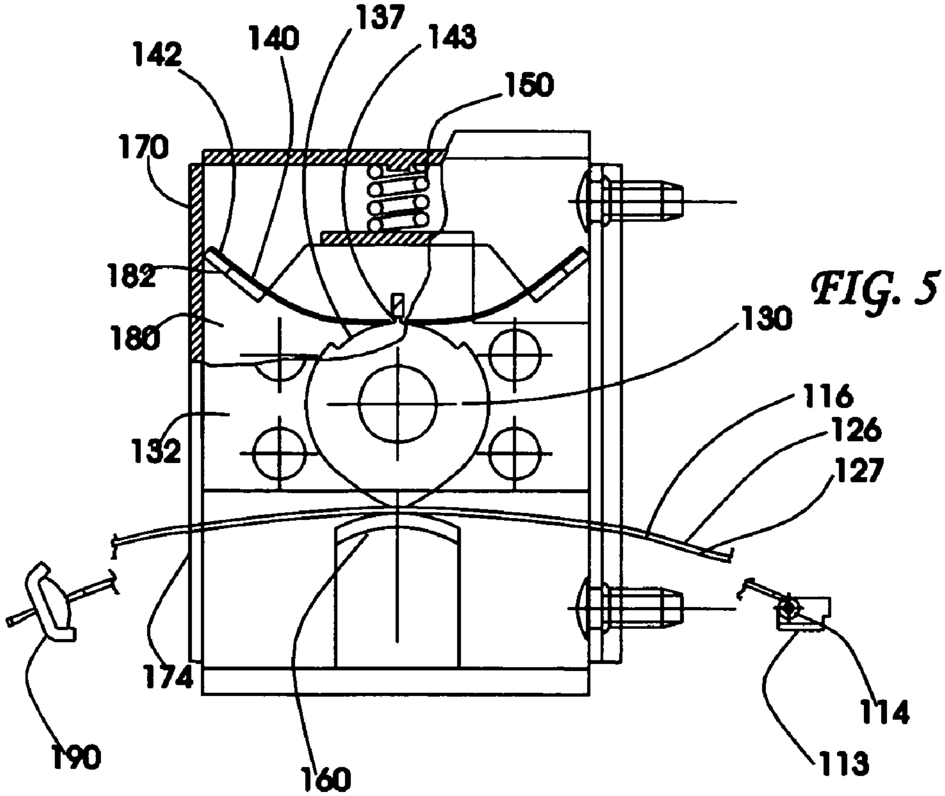
FIG. 5 is a partially sectional plan view of a vehicle door check mechanism constructed in accordance with one embodiment of the invention, with the door partially open and the cam in the full detenting position.

In the views illustrated in FIGS. 2, 4A and 5, the cam 130 is in the totally checked position which requires a force to either further open or close the door, that is to move the strip to the right or the left in FIG. 4A. In this position, cam profile portion 134 at the maximum radial distance from the cam shaft 132, is in contact with the strip member 116 and thus has compressed a biasing spring 150. Biasing spring 150 thus causes cam 130 to exert a force against the strip member 116 that is supported by support member 160. For the strip member 116 to move from this position, sufficient force must be applied to the strip member 116 to cause the cam 130 to rotate further compressing spring 150, since edges 134A and 134B of cam profile portion 134 are at a larger radial distance from the cam shaft 132. The applied force to the strip member 116 additionally must be sufficient to overcome the frictional force exerted by support member 160 against strip member 116. The combination of these forces effectively maintains the strip member 116 in the detented position shown in FIG. 4A against forces caused by most wind gusts and from gravity caused by the vehicle being parked on a hill, for example.

At this juncture, it should be appreciated that the locking member may be other than the irregularly shaped cam shown in FIGS. 2-5 and indeed, other locking members are within the scope and spirit of the invention.

Figure 4B:
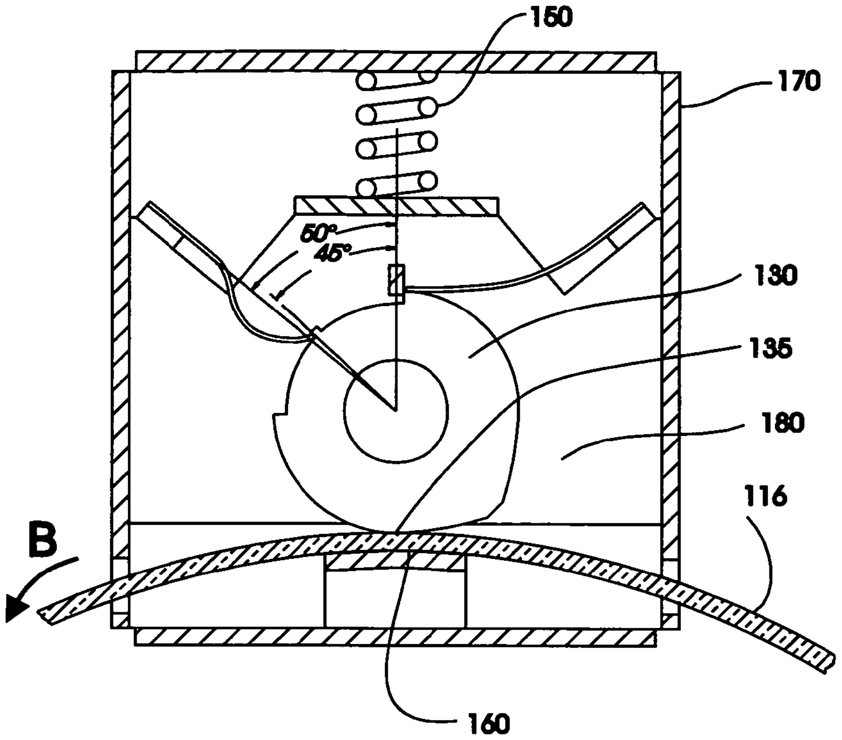
FIG. 4B is a view of the cam and strip member illustrating the mechanism in the non-detenting position where the cam permits free motion of the door in the door opening direction but opposes motion in the door closing direction.

If sufficient force is applied to overcome the forces described above in, for example, the direction to open the door 117, then the cam 130 will rotate to the position as shown in FIG. 4B at which point the cam profile portion 135 is now in contact with the strip member 116. In this position, the cam 130 has moved with cam holder 180, which is fixedly connected to the cam shaft 132, as far as it can go with a front edge 181 in contact with support 160 of housing 170. The entire force exerted by spring 150 is now countered by a force from support 160 onto cam holder 180 and thus the cam 130 no longer exerts a significant force on the strip 116 and the strip 116 moves freely to the right as shown in FIG. 4B. Similarly, sufficient force applied on the strip member 116 to the left in FIG. 4A, toward closing the door, places the cam 130 in the position as shown in FIG. 4C permitting the door to be closed with little additional effort or under its own weight as described in more detail below.

Figure 4C:
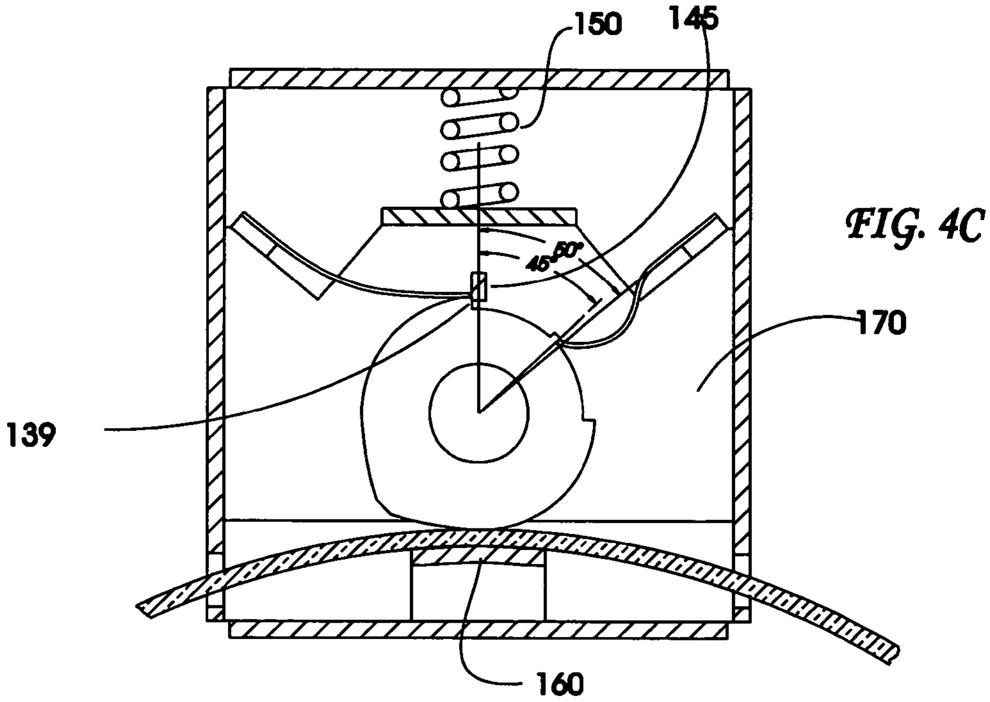
FIG. 4C is a view of the cam and strip member illustrating the mechanism in the non-detenting position where the cam permits free motion of the door in the door closing direction but opposes motion in the door opening direction.

FIG. 4C also illustrates the interaction of tab 145 attached to cam support 170 with edge 139 of cam 130 which limits the rotation of cam 130 and prevents the snap through of the elastica springs 140. Tab 145 is at least partially received within the recessed arcuate surfaces 137,138 of the cam 130. Other types of structure to limit the rotation of the cam 130 may also be applied in the invention.

When the cam 130 is in the position as shown in FIG. 4B and sufficient force is applied to the left on the door 117 to stop the opening momentum of the door 117, the door 117 will remain in position absent additional forces. If the door 117 is designed to be biased toward closing, then even a slight force toward further opening the door 117 will not cause it to move until the bias is overcome. In this position, a small force will cause the door 117 to open further but a much larger force in the closing direction is required to move the strip member 116 to the position as shown in FIG. 4A. The magnitude of this force is determined by the geometry of the cam profile portions 134 and 135, the magnitude of spring force 150 and by the coefficient of friction between the strip member 116 and support member 160.

A slight drag must be exerted onto the strip member 116 by the cam surface profile 136 if the cam 130 is to be engaged by the strip member 116 and caused to rotate without slipping to bring the cam 130 to the position shown in FIG. 4A from the positions shown in FIG. 4B or FIG. 4C. The required magnitude of this drag is determined by the coefficient of friction between the strip member 116 and cam surface profile 135 which determines the point of contact between the strip member 116 and cam profile portion 135. A detailed mathematical analysis of this mechanism appears in Appendix 1. This drag is created by the action of the elastica springs 140 that will now be described.

An elastica spring was chosen for its simplicity. Many other types of springs or combinations of springs and other mechanisms such as cams and linkages could also be designed to perform the desired function. A preferred function for the spring 140 is one that exerts little or no torque on the cam 130 when the cam 130 is in the position as shown in FIG. 4A. As the cam 130 rotates from this position, the spring 140 should exert a force that opposes the motion of the cam 130 and reach a maximum value at some angle between the positions shown in FIGS. 4A and 4B, or FIGS. 4A and 4C at which point the torque should again decrease to where it reaches a value at the positions shown in FIGS. 4B and 4C determined as that required to provide the desired friction drag opposing the motion of the door. This is a preferred torque function and typically results in the greatest difference in cam radii from the locked to the unlocked positions and thus the widest manufacturing tolerances. Naturally, other functions will also work in some designs such as one where a constant torque is applied opposing the motion of the cam away from the position as shown in FIG. 4A, or, a torque function which only applies a torque in or near the positions shown in FIGS. 4B and 4C and is zero everywhere else.

An elastica spring is a spring that acts like a buckled column where when both ends are freely supported, the force does not increase significantly with greater deflection once a minimum deflection is obtained. In the cantilevered implementation used here, the force will increase with increased deflection. As best seen in FIG. 4A, each elastica spring 140 is made from a flat strip of metal and is attached at end 142 by welding or other suitable attachment means to tab 182 which is bent out of a plate forming part of cam holder 180. End 143 of spring 140 rests against cam profile portion 137 in the position shown in FIG. 4A. As the cam 130 rotates toward the position shown in FIG. 4B, end 143 of elastica spring 140 (on the left) engages tab 138 of cam 130 and exerts a torque onto the cam 130. This torque is very small or zero until tab 138 engages end 143 and begins bending spring 140 toward the shape as shown in FIG. 4B. The torque first increases as the elastica spring 140 is compressed but then decreases as the line of force of the elastica spring 140 onto cam 130 approaches a line drawn between support 142 and the cam shaft 132 center. If the cam 130 were permitted to rotate further, the torque would go through zero and begin increasing in the opposite direction, counterclockwise in FIG. 4B or clockwise in FIG. 4C. Since this is not desirable, the rotation of the cam 130 is limited as described below. A detailed mathematical analysis of the forces and torques appears in Appendix 1.

The checking mechanism as illustrated here has been designed for a coefficient of friction of about 0.1 or greater between the cam profile surfaces 135, 134 and the strip member 116. As long as the friction coefficient exceeds this value, the strip member 116 will not slip on the cam 130 and the torque chosen will not cause the cam 130 to slip on the strip member 116. The mechanism can be designed for a lower friction coefficient such as about 0.05 with the result that the tolerances on the parts would become tighter which would increase the manufacturing cost.

An alternate preferred design that can be used even when lubrication is present is described below. Most material combinations exhibit a friction coefficient of greater than about 0.1 providing the surfaces are not contaminated with a lubricant. The possible presence of a lubricant can be compensated for by providing a slight texture to the cam profile portion surfaces 134 and 135. Since there will only be rolling contact between surface 126 of the strip member 116 and the cam profile portions 134 and 135, such a texturing will not cause undue wear to the strip member surface 126. In order to reduce noise, the surface of strip member 116 is preferably made of a plastic such as a filled Nylon or with Milon by DuPont, or a similar polymer. In some applications, an elastomer may be used and in others brake material can be used. A properly designed and made textured surface will defeat the lubricating action of most lubricants by cutting through the surface lubricant film or forcing the lubricant to flow out of the space between the contacting surfaces.

A coil spring 150 is illustrated to create the contact pressure between the cam 130 and strip member 116. Naturally, other types of springs could be used including those made from an elastomer or from a cantilevered beam.

The mechanism described above is illustrated in an exploded view in FIG. 3 and in cross section in FIG. 5. Like reference numbers represent the same parts in each of the views in FIGS. 1, 2, 3, 4A, 4B, 4C and 5.

Checking device 118 includes an external box-like housing 170 which is closed by a cover 176 both of which may be formed of sheet metal and mounted upon door support element 119 by bolts, screws or other fasteners 123. The configuration of housing 170 is not particularly critical. Housing 170 does include two apertures through which the strip member 116 passes. The fastening means 121 connects the housing 170 to the structure to which the door check mechanism 118 is mounted. The housing 170 provides a firm mounting for the cam 130 and cam holder 180. Cam 130 is preferably made by a powder metal or forging or coining technology. Cam holder 180 can also be made from sheet metal. Cam 130, as shown in detail in FIG. 3, may comprise a central shaft 132 on which a bushing member (not shown) is mounted. This bushing member is preferably a precision molded element of relatively hard plastic and may, for example, be formed of heat stabilized, 33% glass-fiber-filled 6-6 nylon or of an aramid fiber reinforced, lubricant impregnated polyfluoroethylene terephthalate (PTFE) resin. Naturally, other materials can be used but those described here tolerate the temperatures associated with the painting of the vehicle door and with the lowest service temperatures likely to be encountered.

The use of metal for the cam 130 and support 160 is predicated upon the assumption that strip member 116 and its surfaces 126 and 127 are formed of a hard, durable resin material such as nylon, so that when the two engage each other, as seen in FIGS. 2-5, the engagement will be that of two dissimilar materials. Of course, if strip member 116 is formed of steel or other metal, then the external surface of cam 130 and support 160 are preferably made of a relatively hard precision molded resin such as heat stabilized glass fiber-filled 6/6 nylon or aramid-fiber-filled PTFE. Alternately, brake material may be used for the surfaces for some applications.

In explaining the operation of vehicle door check mechanism 118, it is most convenient to start from the closed position of door 117. In the closed position, the cam 130 is most likely to be in the position shown in FIG. 4C. To open the door 117, the cam 130 must be rotated past the detented position illustrated in FIG. 4A to the position shown in FIG. 4B. This requires that sufficient force be applied to the door to go through this detent position. In some applications, it may be desirable to eliminate this checking operation during the initial door opening operation. This can be accomplished be removing or thinning the center part of the strip member 116 so that the cam 130 can move to the position where the spring 150 forces edge 181 to engage edge 172 without the cam 130 engaging the strip member 116. This either requires that the strip member 116 be made thicker overall or that the center portion of the strip member 116 adjacent the vehicle support 104 be removed entirely.

To open door 117, the door latch (not shown) is released and the door 117 is pivoted toward an open position with respect to car body 101 and particularly its frame member 104. The direction of this movement is counter clockwise about hinge axis 125, viewed from above. This pivotal movement of the door 117 drives door check mechanism 118 along strip member 116, in the direction generally indicated by the arrow B in FIG. 4B, and compels strip member 116 to pivot about axis 114 of clevis 113. This movement continues, as the door proceeds in its pivotal opening movement, until the desired position of the door has been reached or until the door is fully opened and door stop 190 engages wall 174 of housing 170 (FIG. 5). Door stop 190 is arranged on strip member 116. If the desired position is less than full open then the door 117 will remain in that position absent an additional force to further open the door 117. If the door motion is reversed slightly, the detent will engage as shown in FIG. 4A and the door 117 will remain in that position until a significant force is applied in either direction as described above.

To close door 117, of course, it is pivoted back toward body 101 and frame member 104 (FIG. 1). On the return motion, if desired, door 117 can again be stopped and held at any intermediate position by applying a force in the opening direction until the detent is engaged.

The cam 130 is preferably solid steel providing that the strip member 116 has a polymeric or other non-metallic coating. If the strip member 116 has instead a metallic surface then the cam can be molded of a hard, relatively non-resilient plastic such as a glass-fiber-filled heat stabilized nylon or otherwise have a non-metallic surface. The purpose, as before, is to assure that where the cam surfaces 134, 135, the support surface 160 and the strip surfaces 126,127 engage there are dissimilar materials, avoiding any tendency toward "freeze-up" in operation or unnecessary noise. Also, lubrication is not generally required except on the cam shaft 132. In some applications it may be possible to use metal for both the surfaces of the cam 130 and strip member 116 providing consideration is provided elsewhere to acoustically dampen the resulting noise.

In part due to the distortable nature of the cam 130 (FIGS. 2-5) or the track member (FIGS. 6,7 discussed below) and to the use of different engaging surfaces on the cam and track members, permanent lubrication, as with the use of lubricant impregnated roller shafts or bearing members may be employed, but may be unnecessary in at least some instances.

Figure 6A:
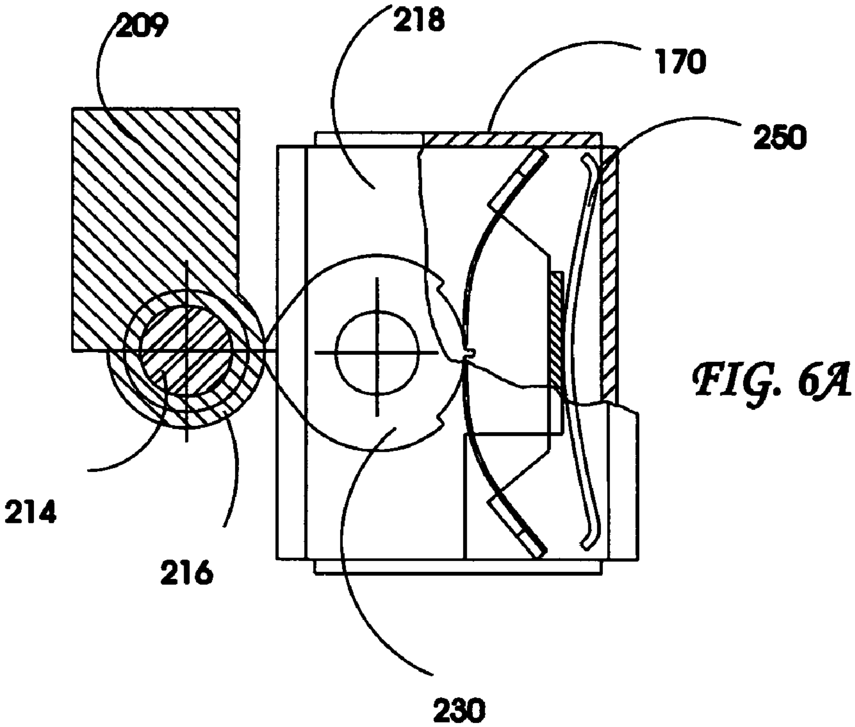
FIG. 6A is a detail view, partly in cross section of another preferred embodiment of this invention of an infinite door check mechanism made integral with the vehicle door hinge with the door shown in the closed position and where the compliance is part of the cam support structure.
Figure 6B:
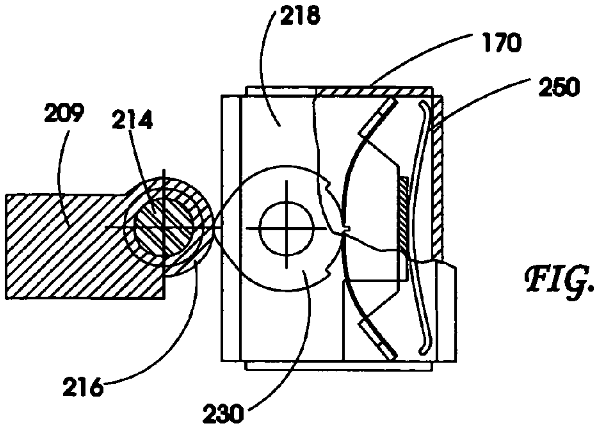
FIG. 6B is a detail view, partly in cross section of the embodiment illustrated in FIG. 6A with the door shown detented in a partially open position.

The preferred embodiment illustrated above is for the case where the checking mechanism is separate from the hinge. The infinite door check mechanism of this invention can be integrated into the hinge itself as is common in the prior art with fixed detect door checks. One example of such a mechanism is illustrated in FIGS. 6A and 6B which are views, partly in cross section, of another preferred embodiment of this invention, of an infinite door check mechanism made integral with the vehicle door hinge with the door shown in the closed position in FIG. 6A and in the open position in FIG. 6B. The operation of this implementation is analogous with that of FIGS. 1-5 above and therefore will not be described in detail. In this embodiment, member 209 is attached to the vehicle A-pillar and rotated about hinge pin 214 defining a rotational axis. An additional part of the hinge mechanism, not illustrated, attaches the door to a hinge member 216 so that checking mechanism 218 also rotates about hinge pin 214. During the rotation of the door relative to the A-Pillar, cam 230 engages the outer circular surface of hinge member 216 in a manner similar to which cam 130 engages strip member 116 in the embodiments of FIGS. 1-5. The cam 230 is illustrated in the locking position in both FIGS. 6A and 6B.

A strip of bent spring material 250 is used in this embodiment instead of the coil spring 150 to force the cam 230 against the outer surface of hinge member 216. Although other constructions of biasing means for forcing the cam 230 against the outer surface of hinge member 216 are possible, this design was selected to reduce the space required for the checking mechanism.

Figure 6C:
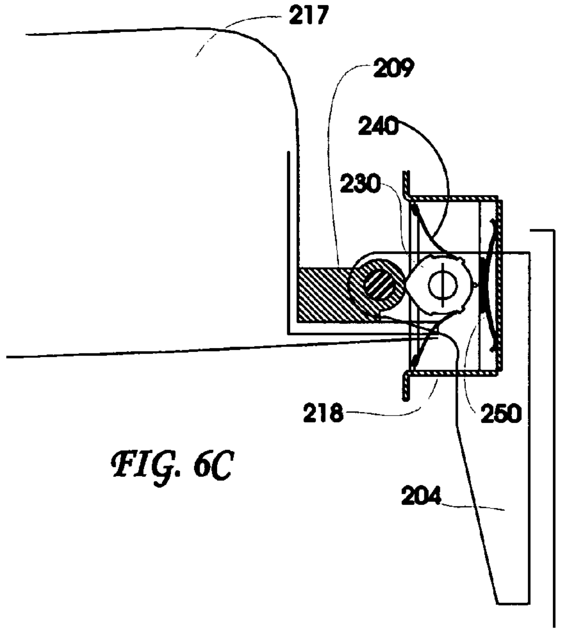
FIG. 6C is a cross section view of an alternate thinner design of the mechanism of FIGS. 6A and 6B with the vehicle and door check supporting structures shown in outline with the door in the open and checked position.
Figure 6D:
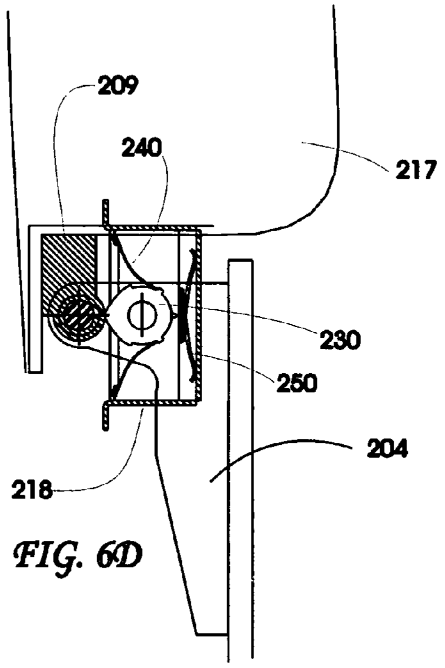
FIG. 6D is a view of the design of FIG. 6C with the door in the closed position.

A variation of this design is illustrated in FIGS. 6C and 6D where the checking mechanism 218 has been attached to the vehicle A-Pillar 204 and member 209 has been attached to the vehicle door 217. In this case, the location of the elastica springs 240 has changed to further reduce the thickness of the door check mechanism 218.

Figure 7:
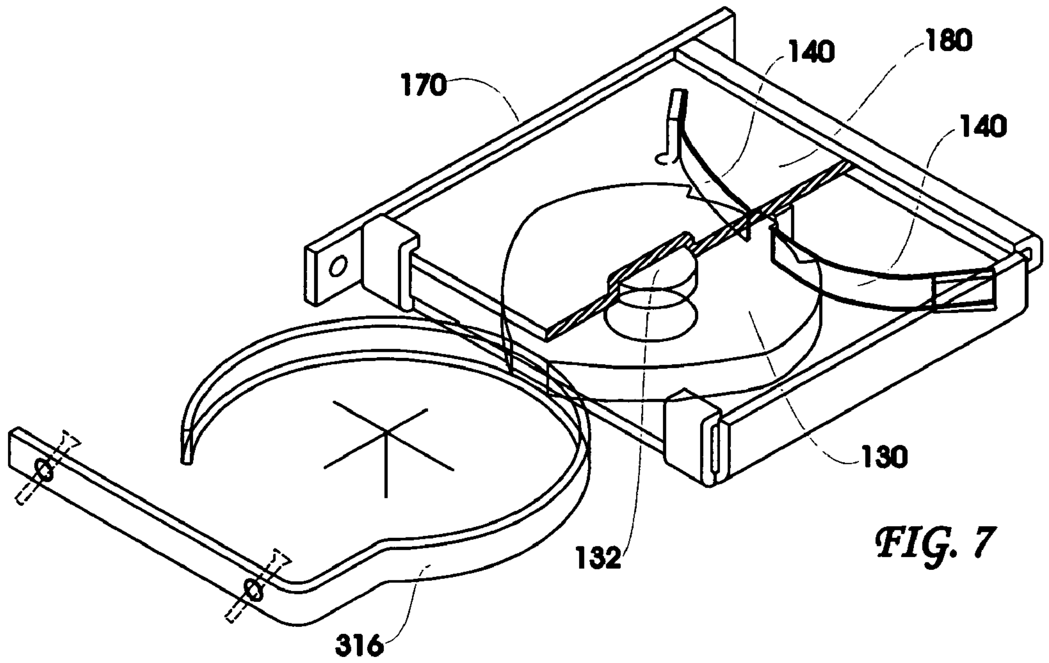
FIG. 7 is a detail view, partly in cross section of another preferred embodiment of this invention of an infinite door check mechanism made integral with the vehicle door where the compliance is part of the strip support structure.

FIG. 7 is a detailed view, partly in cross section of another preferred embodiment of this invention of an infinite door check mechanism made integral with the vehicle door where the compliance is part of the strip support structure. Strip 314 is preloaded against cam 130 that performs similar functions as in the embodiments described above.

Figure 8:
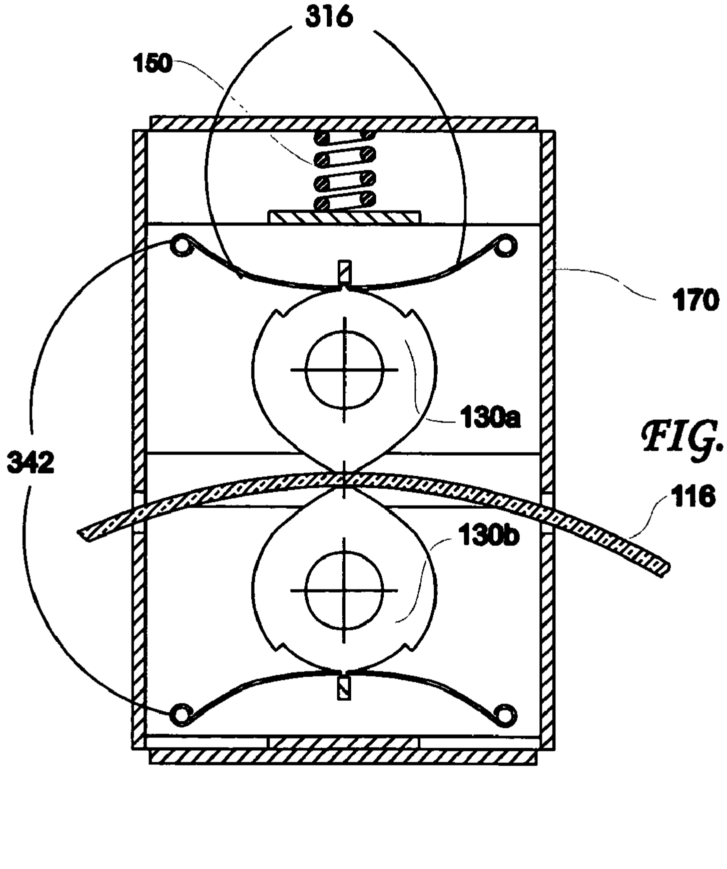
FIG. 8 is a cross section view of another preferred embodiment of this invention where two opposing cams are utilized.

In some implementations where there is sufficient space, two opposing cam mechanisms 130*a*, 130*b* can be used in place of the single cam structure as described above as illustrated in FIG. 8 which is a cross sectional view, each cam mechanism 130 being essentially as described above. In such cases, the door check mechanism will generally be mounted in a vertical plane instead of the horizontal plane illustrated in FIG. 1. In this implementation, elastic springs 316 are shown in a pivoting arrangement about supports 342. This two cam implementation has the advantage of reduced wear since the strip member 116 is not sliding on a support member such as 160 in FIG. 2. In this embodiment, there is only a single spring 150 which is sufficient to exert pressure forcing cam 130*a* against the strip member 116 which is pressed against cam 130*b* thereby securely retaining the strip member 116 in a fixed position.

Figure 9:
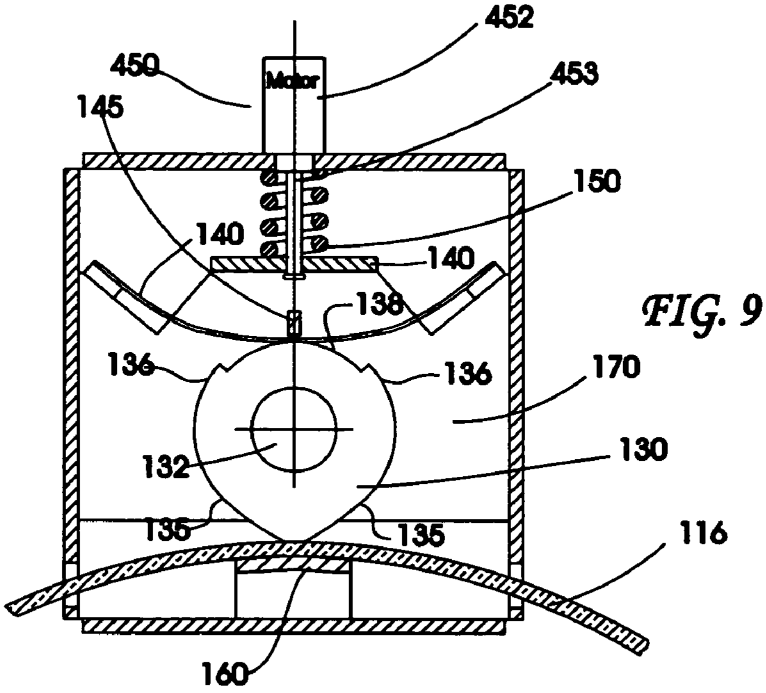
FIG. 9 is a cross section view of the mechanism of FIGS. 1-5 with the addition of an electrically operated release mechanism permitting the door to automatically close under its own weight.

A common complaint among older and disabled people is that once they are in the vehicle and the door is detented open, closing the door can be a difficult chore. What is desired is a feature where with the push of a button, the door will close automatically. This feature can be readily added to the instant invention as shown in FIG. 9 that is a cross section view of the mechanism of FIGS. 1-5 with the addition of an electrically operated release mechanism 450 permitting the door to automatically close under its own weight.

In many cases, doors are designed to be gravity biased to close automatically except for the detenting system. If the detent can be removed in these cases, the door will close automatically under its own weight unless the vehicle is tilted significantly to the side or pointing down a hill. An electrical release mechanism 450 is illustrated in FIG. 9 which utilizes actuation means such as a motor 452 to pull on rod 453 which extends through a cam support bracket 185 by overcoming the force of bias spring 150 and thus cam 130 is moved from engagement with strip member 116. Cam support bracket 185 is a part of cam holder 180. With the detenting and friction forces absent, strip member 116 can move freely and the door closes under its own weight. Motor 452 can be a conventional electric motor acting through a worm gear or similar motion converter, a conventional stepping motor, a thermoactuating motor such as used for some windshield wiper motors using thermoactuating polymers made by the Hoechst Celanese Corporation, or through the use of thermo-actuating wire such as Flexinol™ made by Dynalloy Inc.

Figure 10:
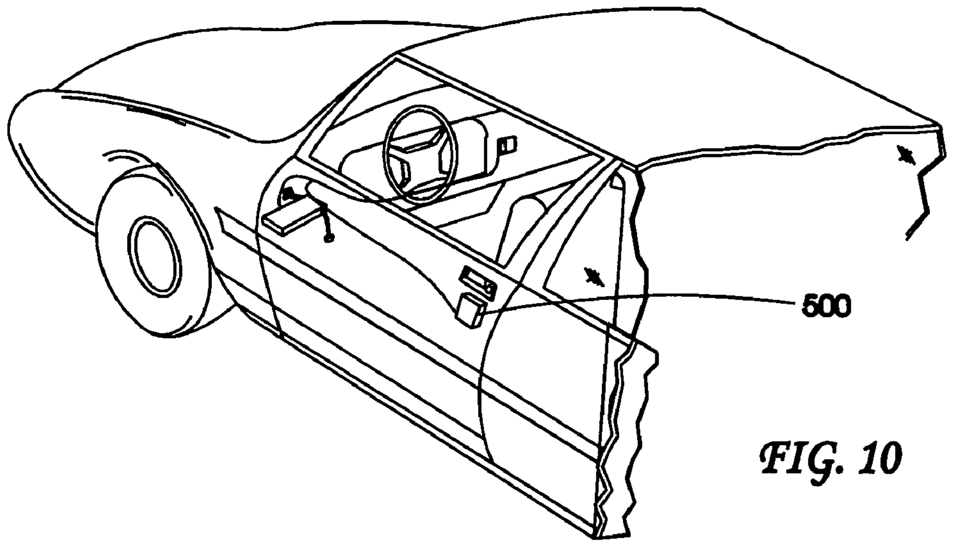
FIG. 10 illustrates an electrically operated door final close mechanism which can be used in combination with the electric release of FIG. 9 to provide for complete door closure.

Usually, the momentum of the door closing as described is insufficient to fully close the door and an additional mechanism is required for pulling the door to its completely closed and latched position. Such a device is illustrated schematically as 500 in FIG. 10. Naturally, although FIG. 10 illustrated the mechanism for the driver door, it can be applied to all of the vehicle doors. Thus using one or more switches, the driver of the vehicle can close all of the vehicle doors automatically. In some cases, it might be desirable to additionally provide for an electric motor door closing mechanism so that the door will close even when the vehicle is parked on a hill.

Figure 11:
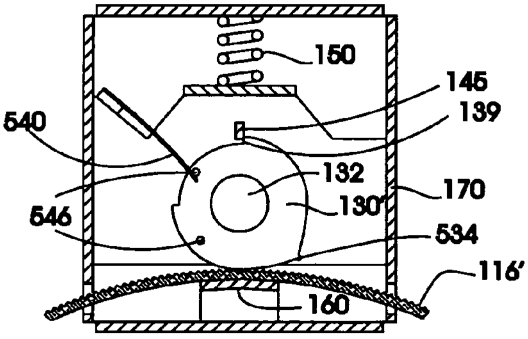
FIG. 11 is a cross section view of the mechanism of FIGS. 1-5 modified to increase the drag of the cam on the strip thereby preventing the door from swinging freely and also incorporating a serrated surface on the strip to increase the effective friction as the strip engages a point on the cam.

The invention as implemented in FIGS. 1-4 above, utilized an elastica spring system which was designed to have a torque function which started at zero in the fully checked position of FIG. 4A increased and then decreased to a low value as the cam moved toward the positions shown in FIGS. 4B and 4C. This design is useful when there is sufficient drag in the door hinges to prevent the door from swinging freely. Without some damping caused by friction drag, the door would not have the customary "feel". One way to add drag to the mechanism of this invention is to maintain a significant torque on the cam so that it always rubs on the strip. One method of doing this is illustrated in FIG. 11 where a cantilevered spring 540 provides a torque function that increases continuously as the cam 130' rotates beyond certain limits. The end of the cantilevered spring 540 that is not mounted to the housing 170 is movable between two projections 546 on the cam 130'. As before, tab 145 interacts with edge 139 to prevent excessive rotation of the cam 130. Other means for increasing a drag force to the cam can also be used in accordance with the invention.

FIG. 11 also illustrates an alternate relationship between the cam 130' and the strip member 116' where a point 534 of the cam 130' is designed to interact with a serrated surface on the strip member 116' much like a single gear tooth engaging a rack of gear teeth. In this embodiment, the coefficient of friction becomes relatively unimportant as a positive engagement is achieved.

Figure 12:
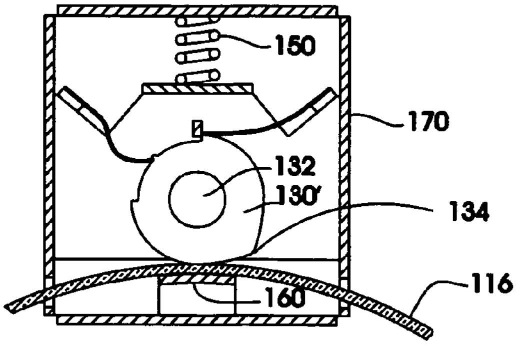
FIG. 12 is a cross section view of the mechanism of FIGS. 1-5 modified to eliminate the flat section on the cam.

In some cases, the door is so strongly biased toward closing that an intermediate checking position is not required. FIG. 12 illustrates the removal of the checking position of FIG. 4A by the reduction of the length of flat surface 134 of the cam 130 to zero length, i.e., a pointed tip. One application for this example is for cabinet doors that are spring-biased toward closing. In this case, the door can be opened to any desired degree and it will maintain that position until a reversing force is applied sufficient to overcome the checking action of the cam 130. Another application for such a design is for vertically opening doors, lids, or covers such as used for vehicle hoods and trunks, for example.

Figure 13A:
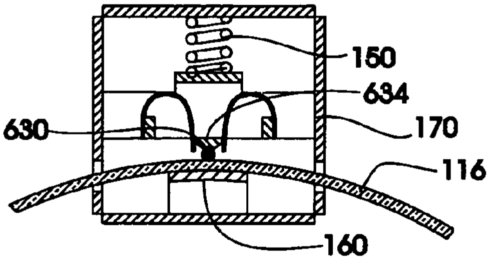
FIGS. 13A, 13B, 13C, 13D, 13E and 13F are alternate methods of practicing the teachings of this invention using other wedging mechanisms in place of the cam (namely, a wedging roller as shown in FIGS. 13A and 13B, a loop spring as shown in FIG. 13F and a 4-bar linkage as shown in FIGS. 13C, 13D and 13E)
Figure 13B:
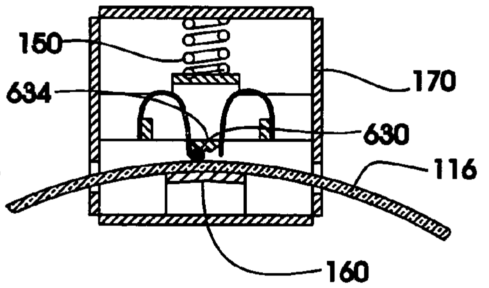

Up until now, a cam type wedging mechanism has been illustrated. Alternate systems can also be used as illustrated in FIGS. 13A-13F. In FIGS. 13A and 13B, the principle of a roller sprag is illustrated. In an arrangement similar to FIGS. 13A and 13B, a ball can be used in place of the roller. The principle of operation is similar but the strip now contains a groove to retain the ball.

A detailed discussion of the operation of the conventional sprag roller system can be found in U.S. Pat. No. 5,482,144 to Vranish which is incorporated by reference herein in its entirety as if it all words and figures were literally inserted here. The sprag disclosed as prior art in the '144 patent has been modified here to permit a certain maximum torque to be transmitted between the driving member (strip member 116) and the driven member (member 634) by means of roller 630 before a snap through to the detent position and then to free motion in the other direction is permitted. In the normal operation of a sprag, the transmitted torque is considered infinite and no snap through feature is provided. The mechanism of FIGS. 13A and 13B is therefore not a true sprag mechanism although the principles of operation are similar.

Figure 13C:
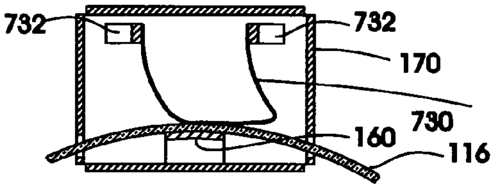
Figure 13D:
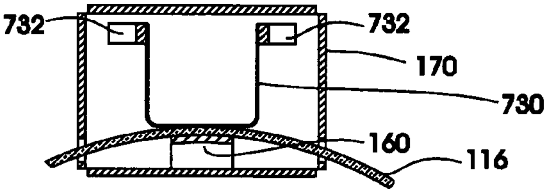
Figure 13E:
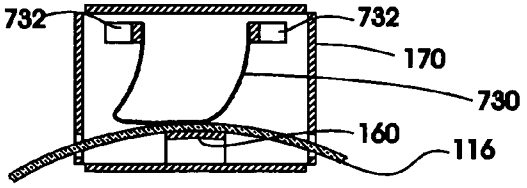
Figure 13F:
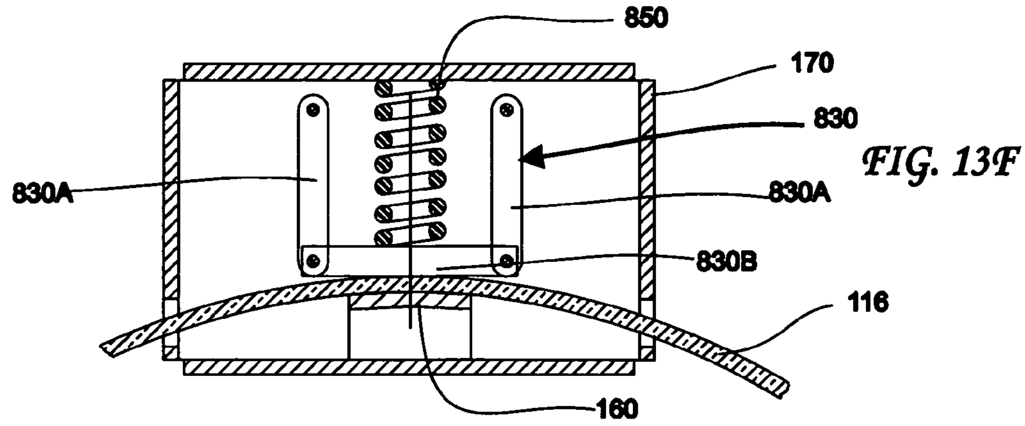

Still another wedging system is illustrated in FIGS. 13C-13E where a piece of spring material 730 is formed so as to provide easy motion of the strip to the right in FIG. 13C, a detent position when motion is reversed as shown in FIG. 13D (in which the spring 730 has a generally U-shape, followed by a free motion to the left after sufficient force has been applied to move out of the detented position as shown in FIG. 13E. The ends of the spring 730 are mounted to tabs 732 bent out of the housing 170. FIG. 13F shows a similar device where the spring 730 has been replaced by a three bar linkage 830 and a biasing spring 850. The three bar linkage 830 includes two opposed bars 830A and one transverse bar 830B. The opposed bars 830A are each pivotally mounted at one end to the housing 170 and at the opposite end, pivotally mounted to the transverse bar 830B.

Figure 14:
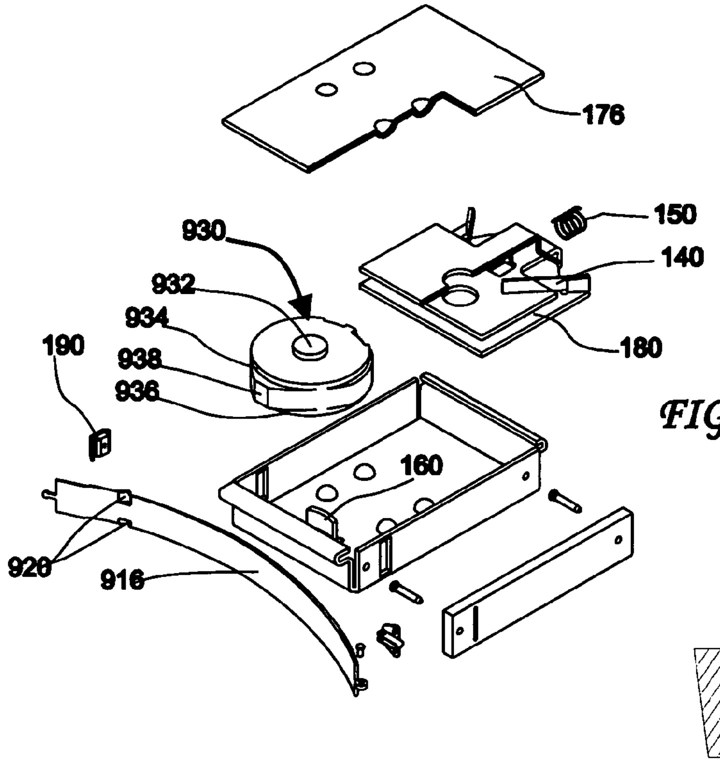
FIG. 14 is a variation of embodiment of FIGS. 1-5 illustrating the use of a fixed detent for the opening motion of the vehicle door at a partially open position.

FIG. 14 is a variation of embodiment of FIGS. 1-5 illustrating the use of a fixed stop for the opening motion of the vehicle door at a partially open position. To this end, the strip member 916 includes projections 920 arranged at the transverse edges thereof and which extend inward toward the cam 930. The location of the projections 920 determines the degree of opening of the door at the fixed stop. The cam 930 is formed to have a central shaft 932, an upper disk 934, a lower disk 936 and an irregularly shaped section 938. The irregularly shaped section 938 may be as described above with reference to FIGS. 2-5. When the strip member 116 and housing 170 are moved with respect to one another during swinging of the door so that the projections 920 contact the upper and lower disks 934,936, the position of the door may be fixed thereat. In other respects, this embodiment is similar to the embodiment shown in FIGS. 2-5.

Figure 15:
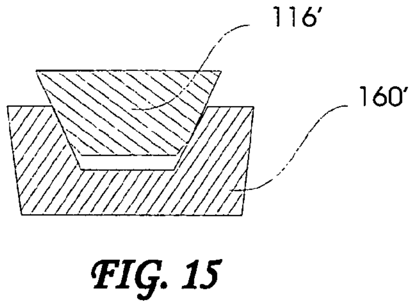
FIG. 15 illustrates another preferred embodiment illustrating the use of angled wedging contact surfaces for the strip and support.

FIG. 15 illustrates another preferred embodiment using angled contact surfaces for the strip and support, in a similar manner as in the Vranish '114 patent referenced above. A similar arrangement can also be used for the cam and strip member. In this embodiment, the strip member 116' has beveled edges and the support member 160' has a groove receivable of at least portion of the strip member 116'.

Figure 16:
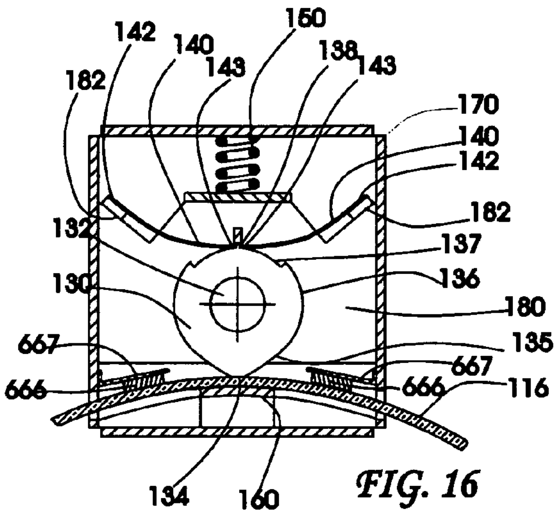
FIG. 16 illustrates apparatus for providing a drag on the door check strip so as to dampen the motion of the door when it is in the non-checked position.

FIG. 16 illustrates apparatus for providing a drag on the door check strip to as to dampen the motion of the door when it is in the non-checked position. In this embodiment, brake material 666 is pressed against strip member 116 by springs 667 mounted on the housing 170.

Figures 17A, 17B, 17C:
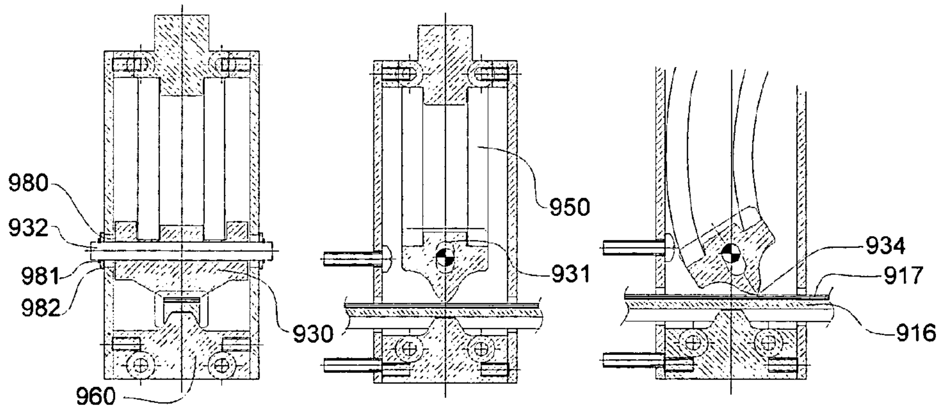
FIGS. 17A, 17B and 17C illustrate another preferred embodiment of the invention.

Several of the features of the above designs are combined in a preferred design illustrated in FIGS. 17A, 17B and 17C. A housing 962 is attached to the door by fastening means 964 which may be screws, nails and the like. The cam 952 is supported by shaft 954 and biased against the strip member 958 by a biasing spring 950. Strip member 958 may be as in any of the embodiments above and is adapted to be mounted to the door frame of the vehicle. That is, strip member 958 is adapted to be mounted to and extend outward from the door frame and is arranged at least partially in the housing 962 and at least partially interposed between the cam 952 (more broadly referred to as a locking member) and a conical support member 960 which is also arranged in the housing 962.

Biasing spring 950 also provides the required torque on cam 952 thus eliminating the need for the elastica springs as in some of the embodiments above. Thus, the biasing spring 950 maybe considered biasing and torque means for biasing the cam 952 against the strip member 958 and applying a variable torque to the cam 952 to thereby vary a force necessary to result in movement of the strip member 958 relative to the cam 952. A detailed analysis of this mechanism is provided in Appendix 2.

The strip 958 contains a surface made from brake material 917 on its top and contains the sprag wedging system of FIG. 15 on its lower surface which mates with the conical support member 960. The shaft 954 is retained in a hole 980 by retaining washer and retaining rings 981 and 982. The cam 952 is thus permitted to move up and down on the shaft through the elongated groove 931. The downward motion of the cam 952 is limited when the cam 952 reaches the bottom of groove 931 at which point the load of the cam 952 against the strip 958 is substantially reduced. The cam tip 956 rolls on the strip surface 917 due to the high coefficient of friction. The sprag effect between the strip 958 and support member 960 multiples the friction drag force providing the needed checking force for the system. Instead of a single biasing spring 950, several springs may be provided.

Figure 18:
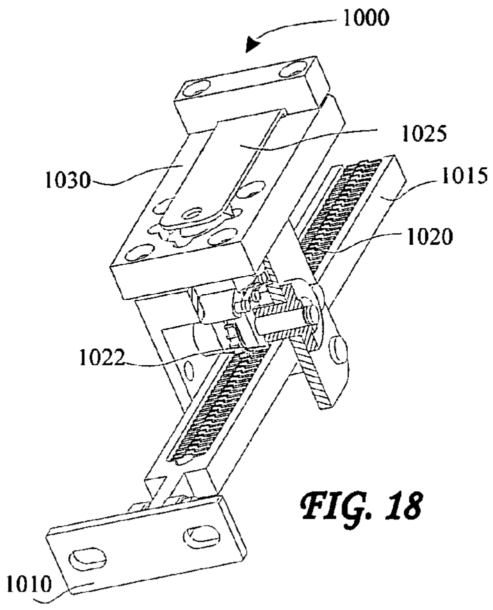
FIG. 18 is a perspective view of a door check in accordance with another embodiment of the invention.

An alternate embodiment of the invention is shown in perspective generally at 1000 in FIG. 18. In this embodiment of the invention, a rack and pinion gearing system replaces the friction system of the earlier designs. More specifically, a rack 1020, or other elongate member with teeth adapted to mesh with those of a pinion or gearwheel, is attached to a frame or strip 1015 and engages a pinion gear or cogwheel 1022. Strip 1015 is guided into engagement with the gear 1022. A frame or housing structure 1030 retains or supports the various parts as described below. Spring 1025 provides the force to check the motion of the door. Bracket 1010 is attached to the door frame and the remaining mechanism, i.e., the frame 1030, is housed within the door or arranged on or in connection with the door.

The spacing and/or number of teeth on the rack 1020 determines the number of different open positions of the door relative to the door frame because the space between each adjacent pair of teeth corresponds to one open position of the door.

Instead of the gear 1022, another movable and/or rotatable member having teeth or projections may be used. The teeth or projections should be designed to engage with the teeth of the rack 1020 to prevent movement of the rack 1020 when the movable/rotatable member is stationary.

Figure 19A:
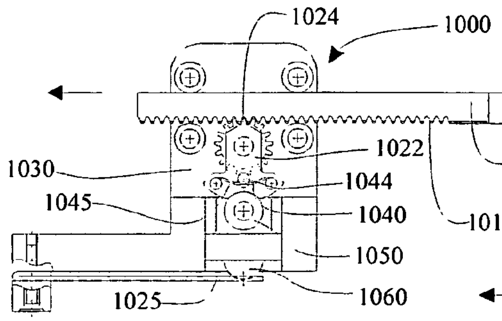
FIGS. 19A, 19B and 19C are side views of different positions of the embodiment of the invention shown in FIG. 18.
Figure 19B:
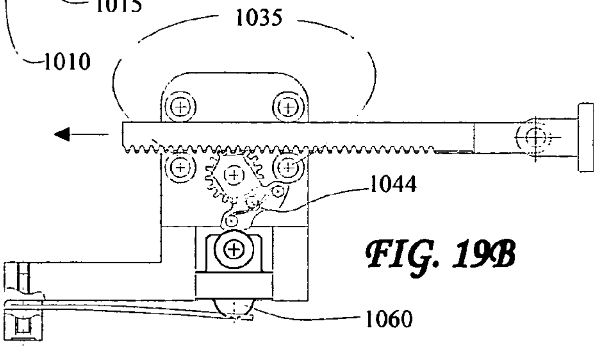
Figure 19C:
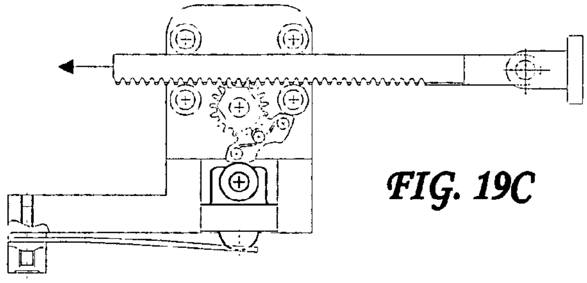

A side view of the mechanism is illustrated in FIGS. 19A, 19B and 19C. In FIG. 19A, the mechanism is shown in the detented position wherein a pawl 1024 of the cam 1040 engages the rack 1020. For the door to move from the detented position, cam 1040 must rotate to permit the pawl 1024 to release its engagement with the rack 1020. Pawl 1024 may be integral with the cam 1040 or formed separate therefrom and attached thereto.

In order for cam 1040 to rotate, a roller 1050 must be forced to move, in a downward direction in the drawing, causing piston member 1060 to depress spring 1025. Otherwise, roller 1050 is pressed by the spring 1025, via the piston member 1060, into an indentation in a surface of the cam 1040 opposite the pawl 1024. The spring 1025 is designed to prevent movement of the piston member 1060 and roller 1050 unless a force above a threshold is exerted on the door, to open or close the door, thereby forcing rotation of the cam 1040 relative to the rack 1020. Such a force above the threshold causes rotation of the cam 1040 and thus downward movement of the roller 1050, piston member 1060 and spring 1025.

The non-detented position of the mechanism is illustrated in FIG. 19B wherein the gear 1022 continues to engage the rack 1020 as the strip 1015 moves relative to the mechanism, toward the left in FIG. 19B (since the strip 1015 is attached to the door frame, the detent mechanism is actually moved relative to the strip 1015). Detent 1044 moves against spring 1045 as the gear 1022 rotates under the force from the rack 1020. This detent 1044 is shown engaging a slot in gear 1022 in FIG. 19A, i.e., a slot defined between two adjacent teeth of the gear 1022.

In FIG. 19B, the detent 1044 remains engaging the same slot between two teeth as in FIG. 19A, in spite of the rotation of the cam 1040. Additional motion of rack 1020 rotates gear 1022, above a threshold force exerted on the door, without further rotation of the cam 1040, which is now pushed against stop 1035, two of which are provided on opposite sides of the gear 1022. The detent 1044 therefore must ride over the next tooth in gear 1022 to permit additional motion of the strip 1015 relative to the mechanism 1000. If the motion of the strip 1015 reverses, the detent 1044 provides sufficient force to hold the cam 1040 and pawl 1024 together until the pawl 1024 is again engaged with the rack 1020 and the mechanism returns to the position shown in FIG. 19A, the detented position.

To summarize, in the initial detented position, both the pawl's tooth and the gear 1022 are meshed with the rack 1020. To start opening or unlocking the detent 1044, it is necessary to apply the appropriate force along the rack 1020 to overcome the cam's fixation that is provided by the roller 1050, piston 1060 and flat spring assembly 1025. During the rack translation, the cam 1040 and gear 1022 rotate simultaneously due to the spring-loaded detent 1044 until the edge of the cam 1040 contacts one of the stops 1035. Thereafter, the gear 1022 is able to rotate relative to the cam 1040 as the rack 1020 continues to move.

The rack 1020 continues its movement in the same direction and the cam shoulder rests against its stop 1035 and the detent 1044 jumps from slot to slot between the teeth in gear 1022 thus maintaining the connection between the cam 1040 and the gear 1022.

To once again engage the door check at the desired position of the door, the motion of the rack 1020 is stopped and a slight movement backward causes the gear 1022 to drive the cam tooth into a meshing engagement. The cam 1040 catches the roller 1050 and locks the rack 1020 with its tooth ready to bare the detenting loads.

As described above, the rack 1020 is mounted in the frame 1015 which is connected to a bracket 1010 which in turn is mounted to the door frame. The detent mechanism is thus arranged in connection with the door. A reverse arrangement is also possible, i.e., the rack being arranged on the door and the detent mechanism being arranged in connection with or housed within the door frame.

In all of the implementations described above, the detenting mechanism has been mechanical. With the trend to add more electronics to automobiles, the door detent system can similarly be accomplished electrically. Such a system can be implemented in numerous ways generally involving a brake mechanism that engages a strip with the force of the brake against the strip being provided typically with a spring and an electrical system such as a motor or solenoid used to remove the brake from strip. Thus, the implementation of an electrical system is relatively simple and the switching system used to activate the electrical system now permits additional comfort and convenience features to be incorporated into the automobile. Additionally, the motion of the door itself can now be motorized. In such a case, a separate brake may not be required as the resistance to rotation of the motor armature itself will serve as the detent system.

In one implementation of such a system, a capacitive sensing area is placed on the door and when the hand of the occupant touches this area, provided the vehicle is not moving and the parking gear engaged, the door will unlock and a motor will begin to open the door. As long as the occupant's hand is adjacent the capacitive surface, the door continues to open with no significant force provided by occupant. Thus, this system is particularly useful to older or disadvantaged people do not have significant strength to open a typically heavy vehicle door. Through touching a second capacitive sensing surface on the door, the door can also be caused to close.

Many other systems can be used to control the doors as well as another vehicle components in addition to switches and mouse pads. These include track balls, sequentially pressing of one or more switches to cause the selection of desired function to change followed by a depression of a second switch that selects the action. In this latter case, the switches can be located on the steering wheel near the edge where the driver's hands normally rest to permit easy operation of these switches using driver's thumbs. For example, a switch can be located near the right side of the steering wheel for activation by the right thumb which could be used to select the function (e.g., open the passenger door) and a switch located on the left side causes the function to be executed (e.g., the passenger door is opened). In general, any of the conventional and even unconventional input devices that are used for manual input of information to a computer can be used in this case. A joystick coupled with a mouse button where the joystick can also be located on the steering wheel is another alternative.

Figure 20:
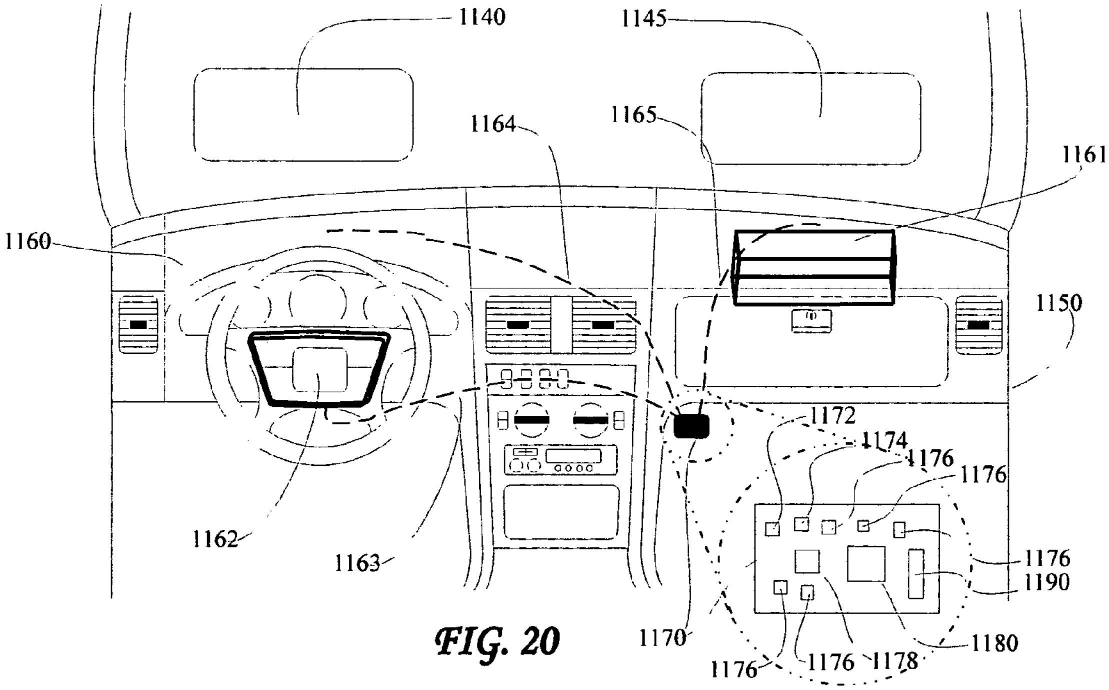
FIG. 20 is a view of the front of a passenger compartment of an automobile with portions cut away and removed showing driver and passenger heads-up displays and a steering wheel mounted touch pad.

Many other types of switching systems can be used. For example, a mouse pad can be adapted to a steering wheel, as disclosed in U.S. patent application Ser. No. 09/645,709 filed Aug. 14, 2000 (incorporated by reference herein in its entirety), as part of the vehicle's component control system. Activating the mouse pad and a heads-up or other type display, the driver can cause any of the doors of the vehicle to open or close. Such a device can be located at other locations in the vehicle as illustrated in FIGS. 20 and 21 and described in more detail below. Other types of switching systems can be used such as SAW based wireless and powerless switches described in U.S. provisional patent application Ser. No. 60/304,013 filed Jul. 9, 2001. An array of such switches, or other types of switches, can be used along with a display or voice system to control the locking, unlocking and motion of the vehicle doors from either one or a variety of locations within the vehicle. A voice activation system for example can be used to operate the vehicle doors. In such a case, the driver can enunciate "open driver door" causing the door to unlock and begin opening. At the appropriate time, driver can say "stop" and the door will then detent at that desired position. Similarly driver can say "close door" and the reverse action is initiated.

In one preferred embodiment of the system, the door opening capability can be provided to driver to open, unlock, close and lock any of the doors, including the trunk, of the vehicle from driver seat location. Generally the other doors of the vehicle can only be operated from the seat adjacent that door except in case of the driver who can operate all of the vehicle doors.

With power operated doors, it is desirable to sense objects or obstructions that may prevent the door from closing and to stop motion of the door when such an obstruction occurs. This can be accomplished in numerous ways such as optically, as described in U.S. provisional patent application Ser. No. 60/292,386 filed May 21, 2001, ultrasonically as described in U.S. Pat. Nos. 5,629,681 and 5,829,782 (all of which are incorporated by reference herein in their entirety), or through sensing the current and/or voltage in the motors used to open and close the door. When that current increases above a threshold, it is assumed that the door has encountered an obstruction and motion is stopped and in some cases reversed.

Similarly, during the opening process of the door and in order to prevent impacts of the door with another vehicle in a parking lot, for example, or a tree or other external object, when the current in the drive motor exceeds a threshold, the motion of the door can be stopped. An override can be provided to account for cases where vehicle is tilted or the door is encountering resistance caused by brush or snow, for example, or other obstruction where the driver desires to continue motion of the door in spite of the obstruction.

More sophisticated sensors can also be used to stop the opening motion of the door to prevent an impact with another object. Such sensors include but are not limited to capacitive sensors, ultrasonic sensors, laser radar sensors, lidar, radar or vision sensors using either visual, infrared, ultraviolet, or any other part of electromagnetic spectrum. For vehicles which have blind spot detectors or anticipatory side impact sensors, for example, the sensing of an obstruction to a powered opening door can become part of such a system.

When a person approaches his or her vehicle from the exterior, a variety of systems can be provided to aid the driver in opening the vehicle door. In one case, for example, the driver can depress a key fob to unlock the door and by holding the button down the door can be opened while the occupant is still some distance from the vehicle. Alternatively, the operator may possess an RFID tag in his pocket, for example, and as he or she approaches the vehicle, the vehicle system interrogates and recognizes the identification on the RFID tag and automatically unlocks and begins opening the door. In another preferred embodiment, the owner will merely touch the door or door handle and the vehicle can recognize the owner through a biometric sensing system, such as a fingerprint, voice print, facial scan, iris scan etc. or through an RFID as mentioned above. Achieving a positive identification, the vehicle can then proceed to open the door. This process in the cases above can be reversed if the owner exerts a threshold force on door opposing its motion.

In the event of an accident, where the occupants are incapable of operating the doors, a voice request to an ONSTAR™ operator, for example, can initiate a remote action to unlock and open the vehicle doors. Similarly, if the ONSTAR™ operator, or other observer, can remotely determine that vehicle occupants have become incapacitated by virtue of an accident, or otherwise, and that the occupants would be aided through opening of the doors or windows, a camera placed within the passenger compartment which sends a view of the compartment could provide sufficient information for such an operator to initiate door or window opening. Although there have been a few vehicle models with unusual door hinging structures, generally the front driver and passenger doors hinge on A-pillar and rotate about an approximately vertical axis. Other door opening schemes have been attempted but are difficult for a driver or other vehicle occupant to operate. Although power sliding doors have the used in some vans, they have heretofore not been adopted for the front vehicle doors. Utilizing the teachings of this invention, this new capability now exists. In fact, there are now many options for the path of the front driver and passenger doors that are now possible. For example, the door can slide forward after first moving laterally outward from the car. In this case, the maximum space becomes available for the driver or passenger to enter or leave the vehicle permitting the entire opening to be available. It also prevents the vehicle door from banging into the sides of other vehicles in a parking lot, for example.

Since the door is operated by electric motors, the path taken by the door is limited only by the imagination of the designer. Instead of going out and then forward for example, the door could be designed to move vertically either straight upward or in a curved path to a position above the vehicle roof. The door could also be made to move toward the rear, however, in some cases this could interfere with the rear doors. It would certainly be possible for a two door vehicle. Finally, the door could even be designed to rotate downward and underneath the vehicle and even provide a step for easy entry and exit from the vehicle. This would be particularly desirable in some high vehicles such as SUVs.

Thus, the addition of electric power to control the opening and closing of the front doors offers many new options for the vehicle designer. The actual path taken by door can be controlled through slide mechanisms or through various linkage designs including four-bar, five-bar, or other spatial linkage mechanisms.

In most or all of the various door configurations discussed above, it is desirable to replace the current wire harness system that brings power and information to and from the door with a similar system. Such systems include a one wire pair system such as described in U.S. Pat. No. 6,326,704 or a wireless system as described in U.S. provisional patent application Ser. No. 60/231,378 filed Sep. 8, 2000 and U.S. patent application Ser. No. 09/765,558 filed Jan. 19, 2001 as desired by the designer (the patent and these applications being incorporated by reference herein in their entirety).

FIG. 20 is a view of the front of a passenger compartment 1150 of an automobile with portions cut away and removed, having dual airbags 1160, 1161 and an electronic control module 1170 containing a heads-up display (HUD) control system comprising various electronic circuit components shown generally as 1172, 1174, 1176, 1178 and microprocessor 1180. The exact selection of the circuit components depends on the particular technology chosen and functions performed by the occupant sensor and HUDs 1140, 1145. Wires 1164 and 1165 lead from the control module 1170 to the HUD projection units, not shown, which projects the information onto the HUDs 1140 and 1145 for the driver and passenger, respectively. Wire 1163 connects a touch pad 1162 located on the driver steering wheel to the control module 1170. A similar wire and touch pad are provided for the passenger but are not illustrated in FIG. 20. These touch pads can provide a method for controlling various vehicle systems and components including a door opening and closing system.

The microprocessor 1180 may include determining means for determining the location of the head of the driver and/or passenger for the purpose of adjusting the seat to position either occupant so that his or her eyes are in the eye ellipse or to adjust the HUD 1140, 1145 for optimal viewing by the occupant, whether the driver or passenger. The determining means would use information from the occupant position sensors such as 1110, 1111, 1113 or other information such as the position of the vehicle seat and seat back. The particular technology used to determine the location of an occupant and particularly of his or her head is preferably based on neural networks or neural fuzzy systems, although other probabilistic, computational intelligence or deterministic systems can be used, including, for example, pattern recognition techniques based on sensor fusion. For the case where a neural network is used, the electronic circuit may comprise a neural network processor. Other components on the circuit include analog to digital converters, display driving circuits, etc.

Figure 21A:
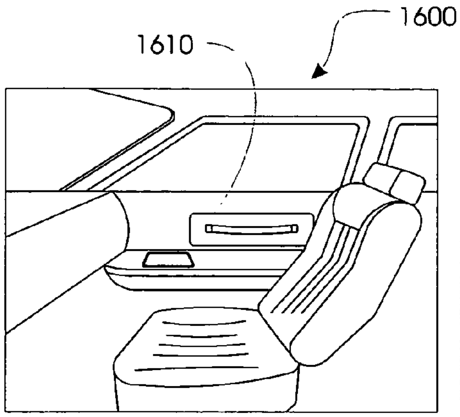
FIG. 21A and FIG. 21B show interior surfaces where touch pads can be placed such as on the armrest and projecting out of the instrument panel, respectively.
Figure 21B:
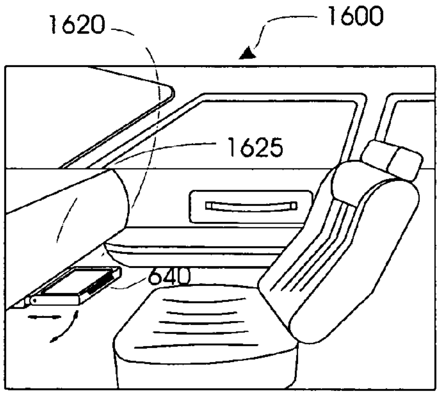

The interior of a passenger vehicle is shown generally at 1600 in FIGS. 21A and 21B.

These figures illustrate two of the many alternate positions for touch pads, in this case for the convenience of the passenger. One touch pad 1610 is shown mounted on the armrest within easy reach of the right hand of the passenger (FIG. 21A). The second installation 1620 is shown projected out from the instrument panel 1625. When not in use, this assembly can be stowed in the instrument panel 1625 out of sight. When the passenger intends on using the touch pad 1620, he or she will pull the touch pad assembly 1620 by handle 1640 bringing the touch pad 1620 toward him or her. For prolonged use of the touch pad 1620, the passenger can remove the touch pad 1620 from the cradle and even stow the cradle back into the instrument panel 1625. The touch pad 1620 can then be operated from the lap of the passenger. In this case, the communication of the touch pad 1620 to the vehicle is done by either infrared or radio frequency transmission or by some other convenient wireless method or with wires.

In any of the various embodiments of the invention described above, the door check mechanism should afford excellent performance characteristics over the full vehicle life. These door check mechanisms provide quiet operation over the full range of door movement, require little or no lubrication and have a minimum of moving parts; they are light in weight and adaptable to use with bolts, butt welding, or virtually any other; mounting arrangement. Corrosion is effectively avoided and adjustment of operational force requirements is readily achieved.

The infinite door check mechanism in accordance with the invention may be used for doors other than vehicular doors, although its use in vehicular doors is of primary importance as the need for such a door check mechanism is most prominent in this regard. There are additionally other non-door applications for the mechanisms disclosed herein. Thus, among the inventions disclosed above is an embodiment of the invention which relates to an infinite position door check mechanism for regulating movement of enabling a vehicle door pivotally mounted on a first support element comprising part of a vehicle frame, between to be moved from a closed position and an open position that is displaced from the closed position by an angle, the vehicle door including a second support element. The door check mechanism comprises a strip member, including an elongated substantially flat smooth surface, a detent cam or other locking member, and mounting means for mounting the strip member on one of the support elements and for mounting the detent cam member on the other of the support elements with the detent cam member aligned with the strip surface. The detent cam member has a rigid surface with a varying radius about its rotation axis that engages the strip member. The strip member preferably has a coating of a polymeric or other non-metallic material on those surfaces that engage the cam. Either a second detent cam member or a support member is provided on the opposite side of the strip from the first cam member. The strip surface and the external surface of the detent cam are preferably formed of dissimilar materials. The detent cam is mounted so that when engaged in a detenting relationship with the strip, it is resiliently pressed against the strip. The resilient cam mounting means and the support means conjointly maintain the detent cam member in pressure rolling engagement with the strip surface during the detenting operation.

During other motions of the door, the detenting cam slides on the strip with very little force. The alignment of the cam member and the strip surface cause the detent cam member to detentingly engage with the strip when the door is pivoted to any partially open position and a force is exerted in the opposite direction so that the detent cam member and the strip member releasably maintain the door in any desired open position.

In one embodiment, the infinite door check mechanism comprises a door check housing adapted to be mounted on the door, a support member arranged in the housing, a rotatable locking member arranged in the housing and an arcuate member adapted to be mounted to and extend outward from the frame. The arcuate member is arranged at least partially in the housing and at least partially interposed between the locking member and the support member. Also, the arcuate member and locking member are movable relative to one another. The door check mechanism further includes biasing means for selectively pressing the locking member against the arcuate member to force the arcuate member against the support member and thereby retain the arcuate member in a fixed position (resulting in checking of the door) and releasing pressure of the locking member against the arcuate member and thereby enable movement of the arcuate member, and torque means for applying a variable torque to the locking member to thereby vary a force necessary to cause movement of the arcuate member relative to the locking member. It can also prevent the locking member from slipping on the arcuate member when the checking is occurring. The arcuate member may be adapted to be pivotally mounted to the frame and have opposed longitudinally extending surfaces, one engaging the locking member and the other engaging the support member.

One disclosed locking member is a cam including an integral cam shaft defining a rotational axis for the cam. The cam has an irregular shape and is arranged to press the arcuate member against the support member with a variable force depending on the position of the cam. For example, the cam can have a first flat surface having edges and second and third arcuate surfaces alongside a respective edge of the first flat surface such that the radial distance at the edges is greater than the radial distance of the first flat surface. A cam holder is connected to the cam and has an edge adapted to contact the support member once the second or third arcuate surface contacts the arcuate member such that the biasing means press the cam holder against the support member. In this manner, there is a release of the pressure applied by the biasing means to force the cam against the support member with the arcuate member interposed between the cam and the support member and enabling the arcuate member to move.

A locking member holder may be connected to the locking member for holding the same and whereby the biasing means comprise an elastic spring operative at one end against the housing and operative at an opposite end against the locking member holder.

The torque means may comprise one or more elastica springs, each mounted at one end to the locking member holder and bearing against the locking member at an opposite end. More particularly, each elastica spring can be arranged to bear against a respective recessed arcuate surface of the locking member. In the alternative, the torque means may comprise a cantilevered spring mounted at one end to the locking member holder and having its opposite end movable between two projections arranged on the locking member An automatic door closing apparatus can be provided for enabling the door to close automatically under its own weight. This may comprise a motor coupled to the housing, and a rod extending into engagement with the support bracket and actuatable by the motor to pull the locking member away from the arcuate member.

Another embodiment of an infinite door check mechanism in accordance with the invention comprises a door check housing adapted to be mounted on the door, a support member arranged in the housing, a rotatable locking member arranged in the housing, a strip member adapted to be mounted to and extend outward from the frame, biasing means for urging the locking member in a direction toward the strip member, and means for increasing a drag force upon rotation of the locking member beyond predetermined limits. The means for increasing the drag force may comprise a cantilevered spring mounted at one end to a locking member holder and having its opposite end movable between projections on the locking member. The cantilevered spring applies a variable torque to the locking member to thereby vary a force necessary to cause movement of the strip member relative to the locking member. The strip member may be serrated on a surface engaging the locking member to thereby form alternating teeth and grooves whereby the locking member has a tip positionable in the grooves.

Another embodiment of an infinite door check mechanism in accordance with the invention comprises a door check housing adapted to be mounted on the door, a support member arranged in the housing, a rotatable locking member arranged in the housing and an elongate strip member adapted to be mounted to and extend outward from the frame. The strip member extends at least partially through the housing and is at least partially interposed between the locking member and the support member. A first spring selectively presses the locking member against the strip member to force the strip member against the support member and thereby retain the strip member in a fixed position resulting in checking of the door and releases pressure of the locking member against the strip member and thereby enable movement of the strip member. One or more additional springs engage with the locking member and apply torque to the locking member to prevent the locking member from slipping on the strip member when the checking is occurring. The locking member and springs may be as described above, Another embodiment of a door check mechanism in accordance with the invention comprises a door check housing adapted to be mounted on the door, a support member and a movable locking member arranged in the housing, a strip member adapted to be mounted to and extend outward from the frame, and biasing and torque means for biasing the locking member against the strip member and applying a variable torque to the locking member to thereby vary a force necessary to result in movement of the strip member relative to the locking member. The strip member is arranged at least partially in the housing and is at least partially interposed between the locking member and the support member. The locking member may comprise a cam in which case, a shaft is provided for supporting the cam in the housing. The cam has a groove through which the shaft passes. The biasing and torque means may comprise one or more springs each coupled at one end to the housing and at an opposite end to the locking member. The strip member has a first surface in contact with the locking member and a second surface opposite the first surface. If the second surface of the strip member includes a groove, the support member has a conical portion engaging with the groove of the strip member to thereby constitute a sprag wedging system.

Yet another embodiment of an infinite door check mechanism disclosed above comprises an elongate strip member mounted to the frame and directed outward from the frame, a door check housing adapted to be mounted on the door, the strip member extending at least partially through the housing, a support member arranged in the housing, a movable locking member arranged in the housing such that the strip member is interposed between the locking member and the support member, and biasing means for selectively pressing the locking member against the strip member to force the strip member against the support member and thereby retain the strip member in a fixed position and releasing pressure of the locking member against the strip member and thereby enable movement of the strip member. The strip member may be arcuate and fixedly or movably mounted to the frame, e.g., pivotally mounted by means of a clevis attached to the frame. The strip member has opposed longitudinally extending surfaces, one of which engages the locking member and another of which engages the support member. The door check mechanism may be mounted either horizontally or vertically in the door.

In certain embodiments, the locking member is a cam including an integral cam shaft defining a rotational axis for the cam or the cam shaft may be fixed in the housing or cam holder and pass through a slot in the cam. The cam has an irregular shape and is arranged to press the strip member against the support member with a variable force depending on the position of the cam. The main door check force is thus the frictional sliding resistance between the strip and the cam or locking member. With respect to the irregular shape of the cam, it may include a first flat surface having edges and second and third arcuate surfaces alongside a respective edge of the first flat surface such that the radial distance at the edges is greater than the radial distance of the first flat surface. If a cam holder is fixedly connected to the cam, the cam holder has an edge adapted to contact the support member once the second or third arcuate surface contacts the strip member such that the biasing means presses the cam holder against the support member thereby releasing pressure applied by the biasing means to force the strip against the support member and enabling the strip member to move, i.e., to any number of different positions relative to the door check housing and thus enable the door to be opened to any desired degree. The cam also includes fourth and fifth recessed arcuate surfaces on an opposite side of the cam from the first flat surface, and rotation limiting means arranged in the housing for limiting rotational movement of the cam, e.g., a tab at least partially extending into one of the fourth and fifth recessed surfaces.

If the locking member is fixed to a locking member holder, an edge of the locking member is adapted to contact the support member upon rotation of the locking member such that the biasing means press the locking member holder against the support member thereby releasing pressure applied by the biasing means to force the locking member against the support member with the strip member interposed between the locking member and the support member and enabling the strip member to move, i.e., to any number of different positions relative to the door check housing and thus enable the door to be opened to any desired degree. Rotation limiting means may be arranged in the housing for limiting rotational movement of the locking member, e.g., a tab at least partially extending into a recessed surface of the locking member. The biasing means may comprise an elastic spring operative at one end against the housing and operative at an opposite end against the locking member holder.

It is an important feature of the invention that torque means are present for applying torque to the locking member to prevent the locking member from slipping on the strip member when the checking is occurring. This may comprise one or more elastica springs, each mounted at one end to the locking member holder and bearing against the locking member at an opposite end. If the locking member is a cam, the elastic springs bear against the fourth and fifth recessed arcuate surfaces, thereby exerting a torque on the cam urging it back to the checked position. In the alternative, the torque means comprise a cantilevered spring mounted at one end to the locking member holder and having its opposite end movable between two projections arranged on the locking member.

In some embodiments, the support member comprises an additional movable locking member arranged such that the strip member is interposed between the two locking members. In this case, the torque means may comprise elastica springs, each pivotally mounted at one end to the locking member holder and bearing against the locking member at an opposite end, e.g., against a respective recessed arcuate surface thereof.

In other embodiments, the strip member is serrated on a surface engaging the locking member to thereby form alternating teeth and grooves and the locking member has a tip 10 positionable within one of the grooves. Thus, the locking member may include a pair of arcuate surfaces adapted to be pressed against the strip member and a pointed tip defined between the arcuate surfaces. In any of the embodiments disclosed herein, the locking member may have a beveled edge and the strip member has a groove for at least partially receiving the beveled edge of the locking member. This creates a sprag effect and increases the frictional force of the locking member against the strip and results in some additional ware.

The door check mechanism in accordance with any of the embodiments of the invention disclosed herein may be incorporated together with an automatic door closing apparatus for enabling the door to close automatically under its own weight or by electric motor. Such an apparatus may comprise a motor coupled to the housing, and a rod extending into engagement with a support bracket associated with the locking member and actuatable by the motor to pull the locking member away from the strip member.

In another embodiment, the infinite door check mechanism in accordance with the invention comprises a door check housing adapted to be mounted on the door, a support member adapted to be mounted to the frame, the support member including a hinge pin defining a rotational axis about which the support member is rotatable, a hinge member arranged around the hinge pin, a movable locking member arranged in the housing to engage the hinge member, and biasing means arranged in the housing for selectively pressing the locking member against the hinge member to force the locking member against the hinge member and thereby retain the hinge member and thus the door in a fixed position and releasing pressure of the locking member against the hinge member and thereby enable rotation of hinge member and thus the door. The mechanism may include a locking member holder fixedly connected to the locking member whereby the biasing means comprise a strip of bent spring material arranged in the housing to exert pressure against the locking member holder and thus the locking member. Drag exerting means may be provided for exerting a drag force onto the hinge member to enable the locking member to rotate without slipping, e.g., at least one elastica spring structured and arranged to apply a torque to the locking member, each mounted at one end to a locking member holder and bearing against the locking member at an opposite end.

The infinite door check mechanism may be arranged opposite to that described immediately above in that the door check housing is mounted on the frame of the vehicle and the support member is mounted to the door, the support member including a hinge pin or member defining a rotational axis about which the support member is rotatable. In this case, the hinge member is arranged around the hinge pin and connected to the door to enable the door to rotate about the axis.

Figure 22:
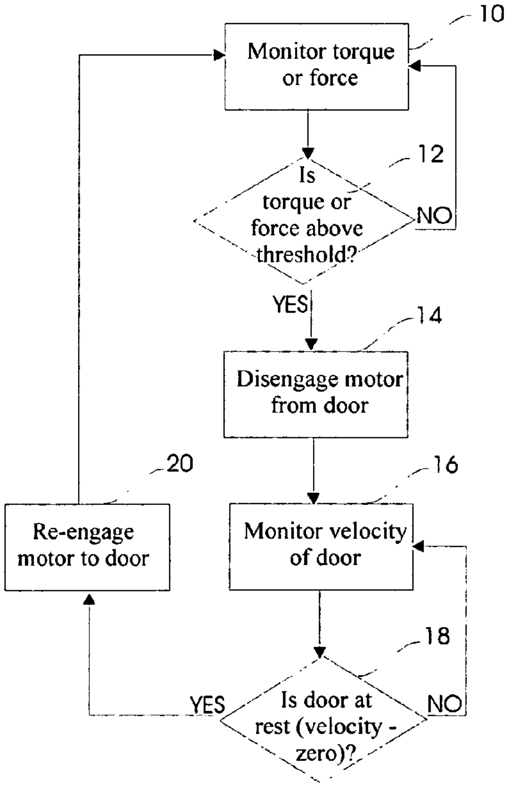
FIG. 22 is a flow chart of the manner in which a motorized door allows for non-motorized operation.
Figure 23:
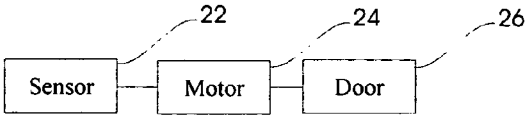
FIG. 23 is a schematic of an apparatus for controlling a door in accordance with the invention.

Referring now to FIGS. 22 and 23, FIG. 22 is a flow chart of the manner in which a motorized door allows for non-motorized operation.

Generally, a motorized door includes a motor which engages with the door to open or close the door upon receipt of a command signal, for example, generated by a button on the door, instrument panel, steering wheel, armrest or some other convenient location in the vehicle. Instead of a button, other means for actuating the motor can also be used such as, for example, a touch pad (possibly placed on the steering wheel), a voice-activation module, a movement-actuation module, etc.

When the door is manually opened or closed, assuming such is possible, the motor or associated mechanism can be damaged or, as a minimum, provides excessive resistance.

To avoid damage to the motor, in accordance with the invention, a torque sensor is provided to monitor the torque on the motor at 10. The measured torque is compared to a threshold at 12 and when above a threshold, the motor is disengaged from the door at 14. The threshold can be set so that whenever the door is manually opened or closed with a minimal force, the torque on the motor caused by such manual operation is above the threshold. Thereafter, the velocity of the door is monitored at 16 and when the door is determined to be at rest at 18, the motor is re-coupled to the door at 20 to check or detent the door in its current position and enable motorized operation of the door.

The coupling between the motor and the door is designed to allow the motor to be de-coupled from the door in order to enable movement of the door without causing damage to the motor, mechanism or excessive resistance to motion. Various ways for constructing the motor and door to achieve this purpose would be readily ascertainable by one skilled in the art in view of the disclosure herein.

One way to decouple the motor from the door is to sever or interrupt the electrical connection between the motor and the door so that motive power generated by the motor is not transmitted to the door. Re-coupling the motor to the door, i.e., when the door has stopped and its velocity is effectively zero, can be accomplished by re-establishing the electrical connection between the motor and the door.

Another way to decouple the motor from the door is a physical separation, e.g., a rotating part of the motor which conveys motive force to the door is moved out of engagement with the door or part thereof by an actuating device such as a hydraulic piston. In this case, the piston is controlled to move the rotating part of the motor to create a gap between it and the door or part thereof. The presence of this gap prevents the rotational force of the rotating part from being transmitted to the door or part thereof so that the door does not move. The piston is actuated in the opposite way to cause re-engagement of the rotating part with the door or part thereof after the door's movement has been stopped.

Formation of a physical separation between a rotating part (or other type of actuating part) of the motor and the door may be preferred so that movement of the door does not damage the motor, in view of the lack of engagement or connecting structure between the motor and door. Toggling an electrical connection between the motor and door to effect the decoupling and re-coupling of the motor to the door might necessitate maintaining the motor in engagement with the door so that manual movement of the door could cause damage to the motor.

In light of the foregoing explanation, one skilled in the art would be able to structure other mechanisms to provide for the decoupling of the motor from the door and re-coupling of the motor to the door based on detected resistance to the opening movement of the door.

Instead of monitoring the torque on the motor, it is possible to monitor the force or torque exerted on the door by an appropriate sensor or sensors.

As shown in FIG. 23, it is desirable to enable the door 22 to be opened or closed automatically by actuating the motor 24. To this end, a sensor 26 is arranged on the vehicle to detect the presence of an individual authorized to open the door and enter the vehicle. The sensor 26 may be a remote device which transmits a signal receivable by the sensor and indicative of authorization to open the door and access the vehicle. The sensor could also be associated with a key-slot receivable of a key. The sensor could also be designed to receive emissions from an RFID or a smart card or include a slot receivable of the smart card.

Upon detection of the presence of an individual authorized to open the door and access the vehicle, or an object possessed by such a person, the sensor 26 sends a signal to the motor 24 to actuate the motor 24 and thereby open the door 22.

Figure 24:
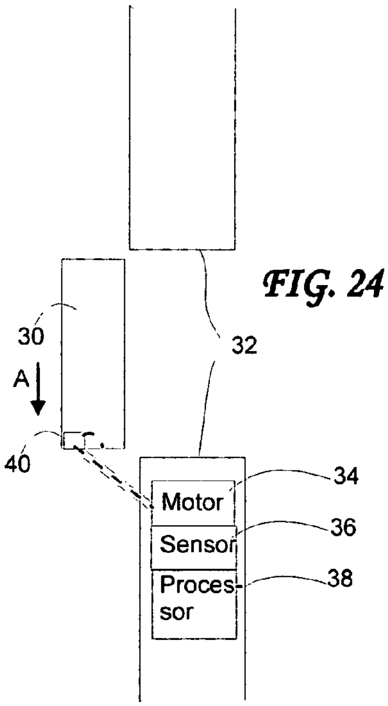
FIG. 24 is a schematic showing another embodiment of an infinite position door check mechanism in accordance with the invention.

Referring now to FIG. 24, an infinite position door check mechanism which allows a door 30 to be opened from a position in a door frame 32 to any of a plurality of different positions, which are not necessarily pre-set positions, can be designed utilizing a motor 34. In this case, the motor 34 is coupled to the door 30 and opens the door 30 to its fullest extent unless resistance is detected (causing the door 30 to move in the direction of arrow A). When resistance to the opening movement of the door 30 is detected, for example, by a torque sensor 36 coupled to the motor 34, the motor 34 is directed by a processor 38 to stop the opening movement. The processor 38 can be designed to be coupled to and receive the detected torque from sensor 36 and compare it to a threshold. The processor 38 is also coupled to the actuating mechanism of the motor 34 which causes it to stop.

Instead of a torque sensor 36, any type of sensor which can be arranged to detect the application of a force or pressure on the door 30 in a direction opposite to the opening direction of the door can be used. This force or pressure can be detected through the operation of the motor 34, e.g., a torque sensor for the motor 34, or by the direct application of pressure to the door 30. In the latter case, pressure sensors 40 can be arranged on the flange of the door 30 and coupled to the processor 38, e.g., by a wire as shown in dotted lines. Pressure sensor 40 can have a pressure sensitive surface oriented in a direction in which the door 30 moves laterally during the opening movement thereof. When it is desired to stop the opening movement of the door 30, a person would touch the sensor 40, this touch being sensed and directed to the processor 38 which would cause the motor 34 to stop the opening movement of the door 30. A sensor similar to pressure sensor 40 can be arranged on the other side of the door 30 so as to be in a position to enable a person to apply pressure thereto in order to stop the closing movement of the door 30.

Instead of controlling the motor to direct movement of the door or cessation thereof, it is possible to provide a system wherein capacitance is used to indicate a desire to stop the movement of the door. Alternatively, an optical sensor can be used to obtain images of the area in the path of the opening or closing door and analyze the images to detect obstacles to the opening or closing movement of the door therein.

As the population ages, and as people continue operating a vehicle into their later years, more and more people are faced with difficulty in opening and closing vehicle doors. For an older driver, for example, it is difficult to reach out to grab and close the driver door after he or she enters the vehicle. Similarly, after the vehicle has reached its destination, an older driver has difficulty in opening the vehicle door sufficiently for it to remain in position allowing the driver to egress from the vehicle comfortably. Several designs are presented below of powered doors that solve this problem in a variety of ways. These are meant to be illustrative of the many ways that this problem can be solved and the invention is not limited by the examples below.

An intent of some embodiments of the invention is to provide a door that can be operated by a switch which can be located in a variety of convenient locations such as on the armrest between the driver and passenger, on the steering wheel, on the instrument panel or at any other convenient position. It can even be in the form of a wired or wireless remote that normally rests on in the instrument panel or armrest or other convenient location or it can reside in a key fob that the driver carries with him or her. Naturally, more than one switch can be provided, e.g., multiple switches each at a different location. When the driver wishes to open or close the door, he or she can depress the button during the entire time required for the door to open or close, or the system can be designed such that a momentary depression of the switch causes the door to fully open or fully close. In either case and particularly in the latter case, a proximity device can also be incorporated into the door system to prevent it from impacting another object such as an obstacle in the vicinity of the vehicle, such as another nearby vehicle, pole, ceiling, or pedestrian, for example, or some part of the operator such as his or her leg, arm, finger etc.

The door can be powered by a variety of methods including an electric motor engaging the door mechanism though a gear, chain, belt or other arrangement. Also, the motor can operate a pneumatic or hydraulic pump and the door can be operated using a piston and cylinder arrangement. The particular manner of applying power to the door will depend on the vehicle door system designer and will vary from vehicle application to vehicle application.

Figure 25:
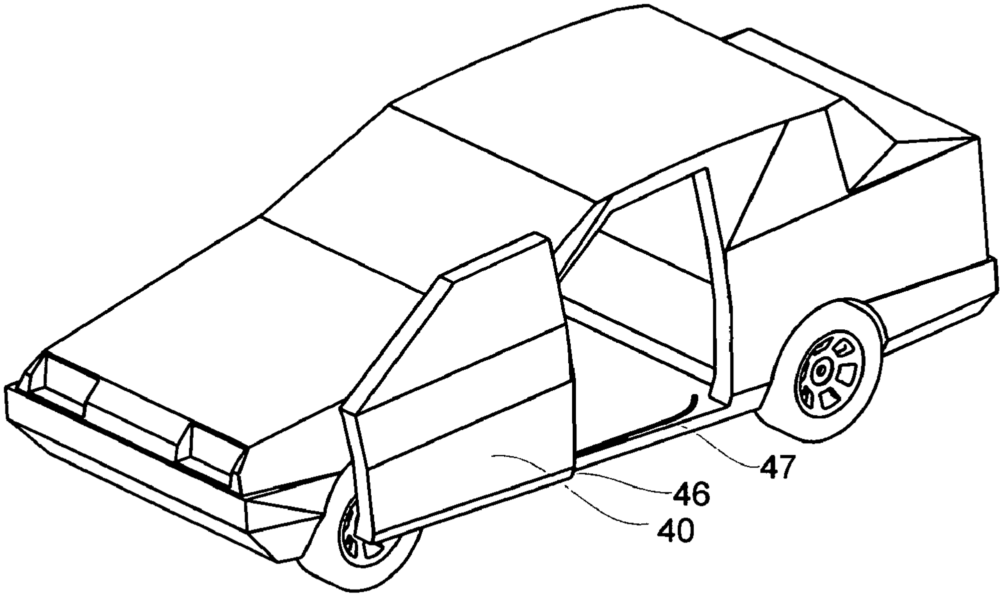
FIG. 25 is a view of a vehicle with a motorized sliding forward driver door.

One example of a powered driver door is illustrated in FIG. 25 which is a view of a vehicle with a motorized driver door 40 which slides forward upon opening. An electric motor 41 engages a gear 42 which causes shaft 43 to rotate which causes lever arms 44 and 45 to exert a force on the door 40 causing the front edge of door 40 to initially move outward and then forward as the rear edge 46 of door 40 rides in a track 47. In this manner, the door 40 moves forward exposing the driver seat for the driver to easily enter or exit the vehicle. Since the door 40 remains relatively close to the vehicle, the chance of the door 40 impacting another object outside of the vehicle is minimal. If further improvements are desired to cause the door to hug the vehicle, then a more complicated mechanism can be used. Such a mechanism can be based on four-bar linkages, for example. There a large number of designs of mechanism such as the guided sliding mechanisms often used for rear sliding doors for vans, SUVs and other vehicles.

Figure 25A:
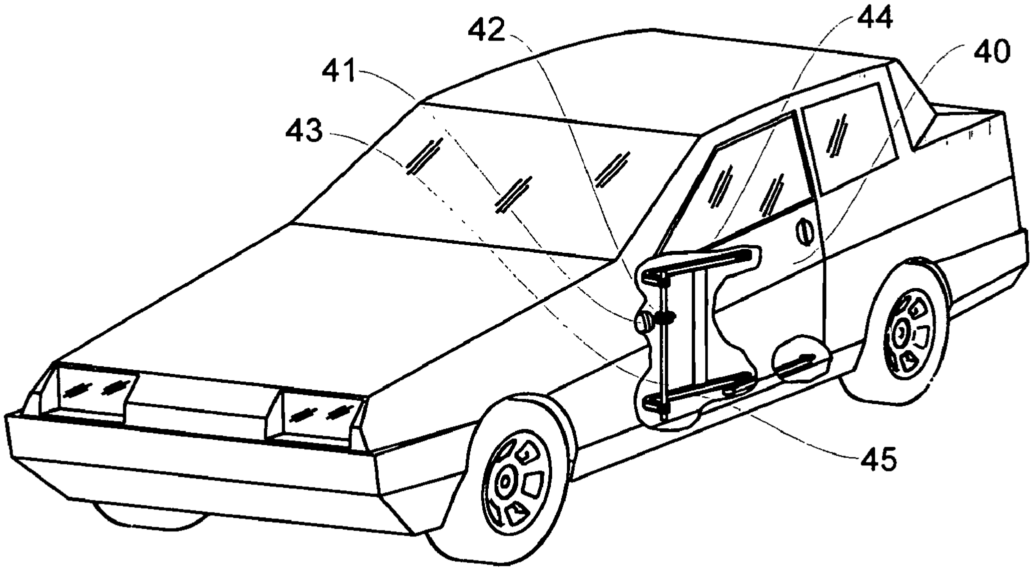
FIG. 25A is a view of the vehicle of FIG. 25 with portions of the door removed to expose the door opening mechanism.
Figure 25B:
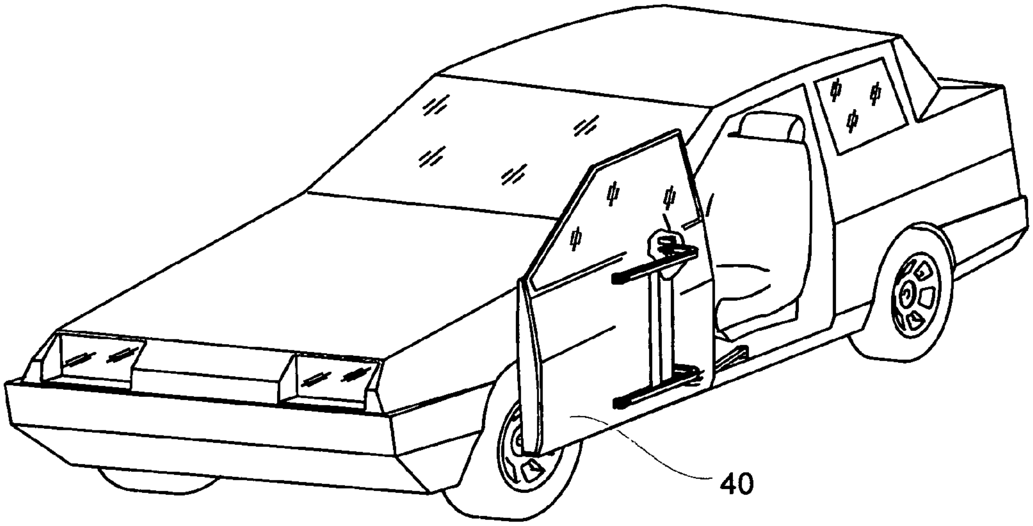
FIG. 25B is a view of the vehicle of FIG. 25 with portions cutaway showing the door in the open position.
Figure 25C:
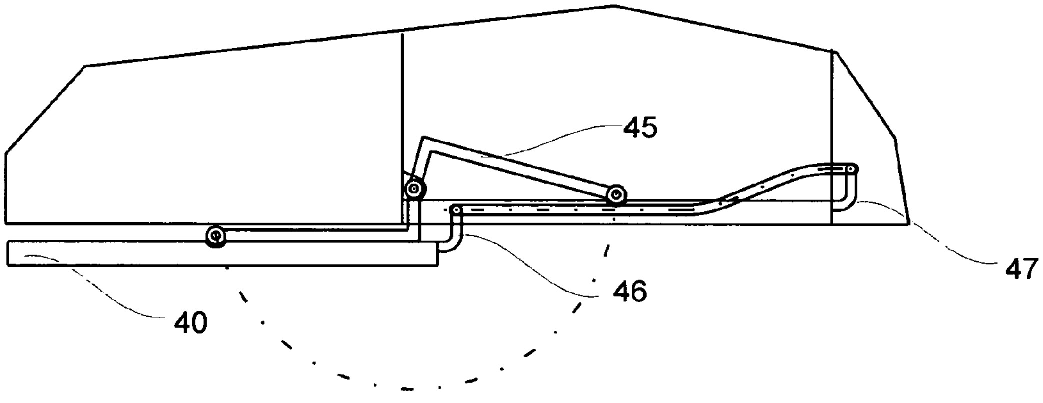
FIG. 25C is a view of the door opening mechanism of the vehicle door of FIG. 25.

FIG. 25A is a further view of the vehicle of FIG. 25 with portions of the door removed to expose the door opening mechanism and FIG. 25B is a view of the vehicle of FIG. 25 with portions cutaway showing the door in the open position. A detail of the door opening mechanism of the vehicle door of FIG. 25 is illustrated in FIG. 25C.

Figure 26:
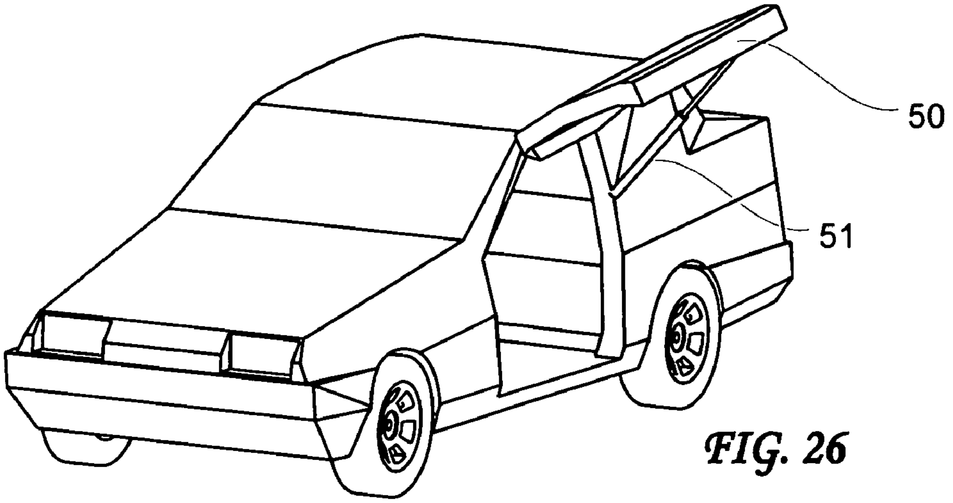
FIG. 26 is a view of a vehicle with a powered gull wing door design with the door in the open position using a simple hydraulic powered opening mechanism.

A powered gull-wing door design 50 with the door in the open position using a simple hydraulic powered opening mechanism is illustrated in FIG. 26. A hydraulic or pneumatic pump, not shown, provides pressurized fluid to operate cylinders 51.

Figure 27:
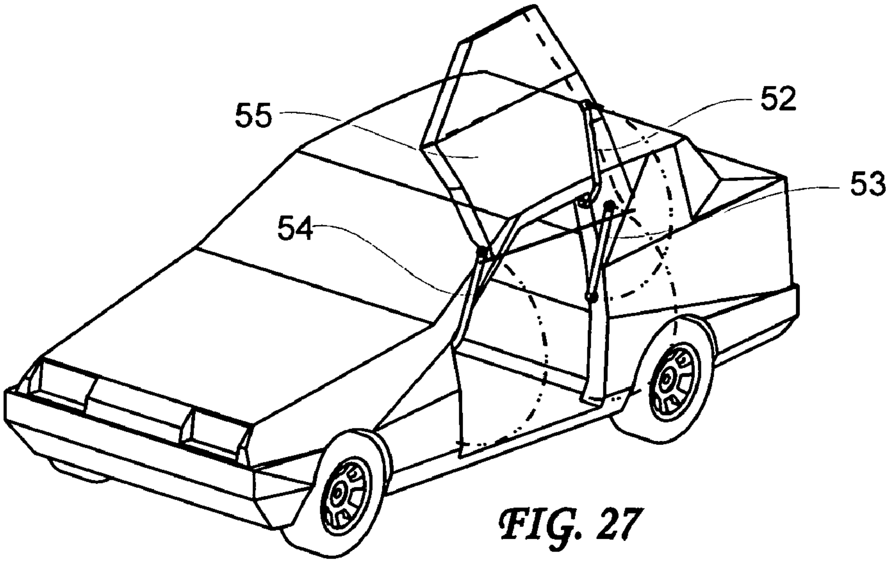
FIG. 27 is a view of a vehicle with a powered door making use of linkages to move the door upward with the door rendered transparent so as to expose the linkage mechanism.
Figure 27A:
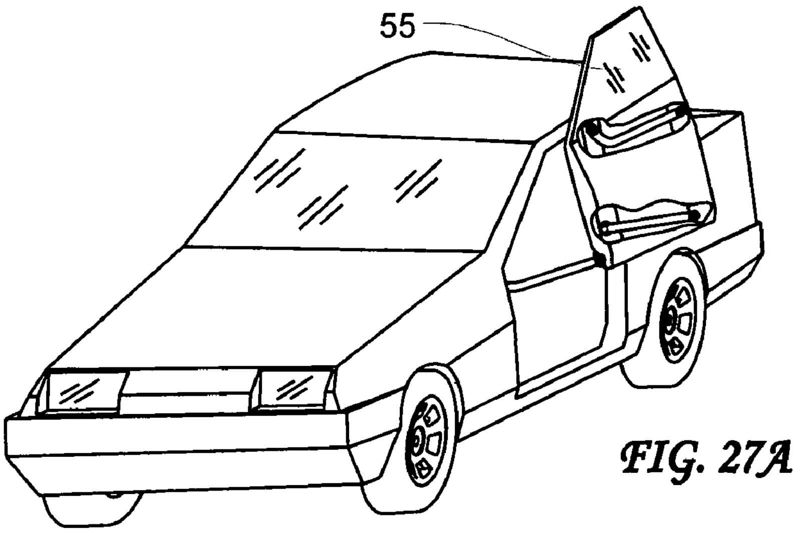
FIG. 27A is a view of the vehicle of FIG. 27 with the door in a partially open position with portions of the door cutaway to expose the linkage mechanism.

In FIG. 27, a design of a vehicle with a powered door 55 making use of a linkage mechanism of linkages 52, 53, 54 to move the door 55 upward is shown. The door 55 is rendered transparent so as to expose the linkage mechanism. Power is supplied by a motor (not shown) and means to attach the motor to operate the door 55 (not shown) in any one on a number of possible manners. FIG. 27A is a view of the vehicle of FIG. 27 with the door 55 in a partially open position with portions of the door 55 cutaway to expose the linkages 52, 53, 54.

Figure 28A:
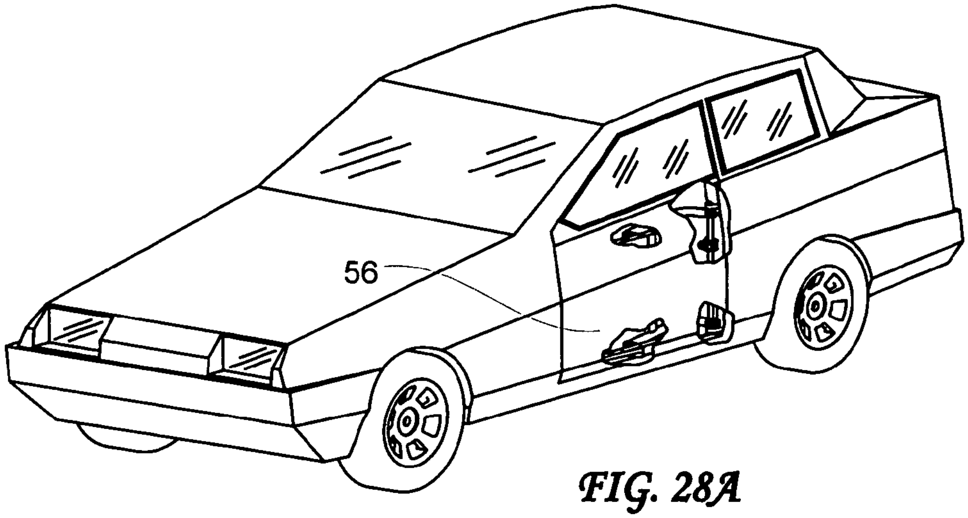
FIG. 28A is a view of a vehicle with a powered door using linkages to move the door out and to the rear shown in the closed position.
Figure 28B:
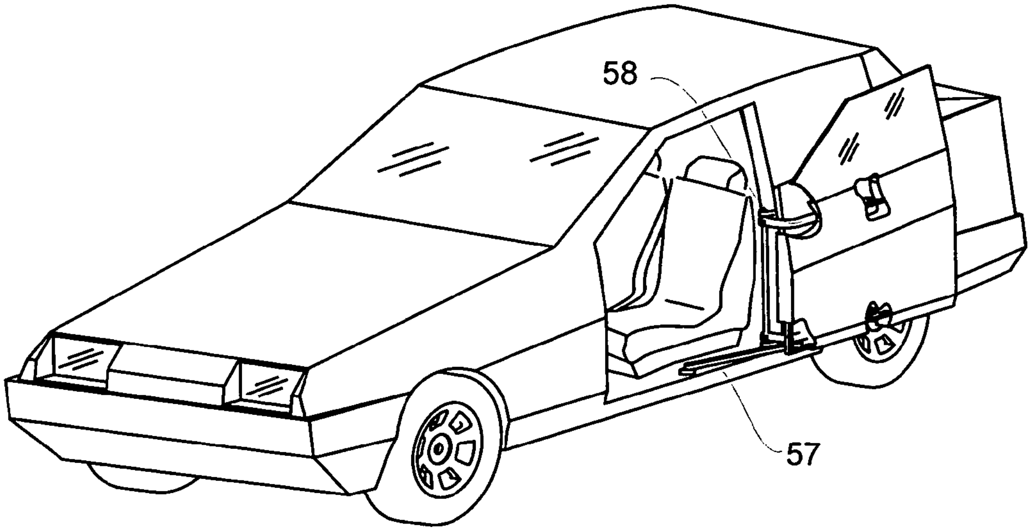
FIG. 28B is a view of the vehicle of FIG. 28A with the door in the open position.

FIG. 28A is a view of a vehicle with a powered door 56 using linkages to move the door out and to the rear with the door 56 shown in the closed position. A linkage mechanism using linkages 57 and 58 is used to move the door 56 first out and then to the rear of the vehicle. FIG. 28B is a view of the vehicle of FIG. 28A with the door 56 shown in the open position.

Preferred embodiments of the invention are described above and unless specifically noted, it is the applicants' intention that the words and phrases in the specification and claims be given the ordinary and accustomed meaning to those of ordinary skill in the applicable art(s). If applicants intend any other meaning, they will specifically state they are applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C. §112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

Although several preferred embodiments are illustrated and described above, this invention is not limited to the above embodiments and should be determined by the following claims. Indeed, it will be understood that numerous modifications and substitution can be made to the above-described embodiments without deviating from the scope and spirit of the invention. Accordingly, the above-described embodiments are intended for the purpose of illustration and not as limitation.

APPENDIX 1

Design and Analysis of Door Check Device (FIGS. 1-5)

The cam pivots about a point O. A line from O perpendicular to the strip intersects the plane of the strip at a point V, fixed in space. In the locked position, a line from O to V intersects the cam surface at a point C, fixed on the cam. Since the system must perform equally for motion of the strip in either direction from the locked position, the cam should be symmetric about the line OC. Motion of the strip to the right, with counter-clockwise rotation of the cam, will be analyzed but the results for motion of the strip to the left will be the same with some obvious changes in sign. The following parameters are defined (CW stands for clockwise, CCW for counter-clockwise):

| | |
|---|---|
| P | is any point on the cam surface, |
| $\theta$ | is the angle between OC and OP, positive if OP is CW from OC, |
| $R(\theta)$ | is the distance from O to P, |
| Q | is the point on the cam contacting the strip, once the strip begins to move, |
| $\phi$ | is the angle between OQ and OV, positive if OQ is CCW from OV, |
| $\psi$ | is the CCW rotation of the cam from its locked position, the angle between OV and OC, |
| $\theta_Q$ | is the angle between OC and OQ, $\theta_Q = \psi - \phi$, |
| $R_Q$ | is $R(\theta_Q)$, |
| y | is the distance from O to V, $y = R_Q \cos(\phi)$, |
| $\delta y$ | is the distance the pivot point O must be moved toward the strip to rest on its support and reduce the force between the strip and cam, |
| $\xi$ | is the distance from the line OV to point P, $\xi = R \sin(\psi - \theta)$, |
| $\eta$ | is the distance of P from the strip, $\eta = y - R \cos(\psi - \theta)$, |
| F | is the component along OV of the external force on the cam, |
| $F_t$ | is the component parallel to the strip of the force on the cam from the strip, positive in the direction of motion of the strip, |
| T | is the external CW torque on the cam about the pivot, |
| $\mu$ | is the design coefficient of friction between the cam and the strip; the actual coefficient of friction must be at least $\mu$, |
| x | is the motion of the strip from the locked position, |
| w | is the distance between V and Q when the strip begins to move, |

the subscript i indicates initial values, with the system in the locked position and the strip just beginning to move.

For a point fixed on the cam surface, $\theta$ and R are fixed and as the cam rotates, $$d\xi = R\cos(\psi-\theta)d\psi \text{ and } d\eta = dy + R\sin(\psi-\theta)d\psi.$$

For the point instantaneously at Q, $d\eta=0$ and $dy=R_Q \sin(\phi)\, d\psi$.

If the cam does not slip on the strip then $d\xi=dx$ and $dx=R_Q \cos(\phi)\, d\psi$. Thus, $$dy/dx=-\tan(\phi).$$

A moment balance on the cam about the point O leads to:

$$T=F\,y \tan(\phi)+F_t y.$$

Since $|F_t|$ must be $\leqq \mu F$, the torque T must be between $T_{min}$ and $T_{max}$ where $$T_{min}=F\,y(\tan(\phi)-\mu) \text{ and } T_{max}=F\,y(\tan(\phi)+\mu).$$

Or, if T, F, y, and μ are specified, then tan((p) must be between $T/(F\,y)-\mu$ and $T/(F\,y)+\mu$.

Note that $F_t=T/y-F \tan(\phi)$ can become negative after (p is positive. This means that the cam action is pushing the door farther in the direction of its initial motion. It might be necessary to limit this pushing action to a value $F_{tmin}$ to keep the door from getting out of control.

When the strip first begins to move, it could be moved in either direction, and by symmetry the torque T must be zero. Then, $F_{ti}=-F_i \tan(\phi_1)=F_i\, w/y_i$ and, for specified $F_{ti}$ and $y_i$, w should be as large as possible to minimize the required $F_i$. Since $F_{ti}$ must be less than or equal to $\mu F_i$, w must be less than or equal to $\mu y_i$. In the design w is set equal to $\mu y_i$ and then $F_i$ is equal to $F_{ti}/\mu$.

The system is completely unlocked when the pivot O rests on its support, when O has been lowered by δy. For this to occur with as small a strip motion x as possible, tan(ξ) should be as large as possible. Initially φ is negative ($\tan(\xi_1)=-w/y_i=-\mu$), but as the strip moves φ increases:

$$d\phi/dx=d(\psi-\theta_q)/dx=(d\psi/dx)(1-d\theta_q/d\psi)=(1-d\theta_q/d\psi)/y.$$

Now, $d\theta_q/d\psi$ cannot be negative, so to increase (p as quickly as possible $d\theta_q/d\psi$ should be zero as long as possible, that is the same point on the surface of the cam should remain in contact with the strip. This is possible if the tangent to the surface of the cam just left of the initial Q makes a positive angle with the strip. The current Q can be kept at the initial Q until $\tan(\phi)=T/(F\,y)+\mu$ or $\tan(\phi)=T/(F\,y)-F_{tmin}/F$, whichever comes first. After that, the increase in φ must be controlled so that tan(φ) does not become greater than the current value of $T/(F\,y)+\mu$ or $T/(F\,y)-F_{tmin}/F$, whichever is smaller.

φ can be controlled by controlling the curvature of the cam surface. If the contact point Q is on a portion of the cam surface with a smooth curvature, then the location of the contact point could be determined as follows. Consider again the general point P on the cam surface. If θ is varied without changing ψ, then y is constant and $d\eta=-dR \cos(\psi-\theta)-R \sin(\psi-\theta)\, d\theta$. At the contact point Q dη is zero, $R=R_Q$, $\psi-\theta=\phi$, and $dR/d\theta=-R_Q \tan(\phi)$.

After the cam pivot is resting on its support, if the strip is moved farther then the strip slips under the cam and the cam does not rotate any more. The cam then exerts a normal force $F_N$ on the strip and this causes a tangential force $F_t=\mu_a F_N$, where $\mu_a$ is the actual coefficient of friction which may be greater than the design value μ. A moment balance about the hinge pivot leads to $F_N=T/(\mu_a y+R_Q \sin(\phi))$ where T, y, $R_Q$, φ are the values when the pivot reaches its support.

Design Steps

1. Specify the holding force $F_{ti}$, the initial distance $y_i$ of the pivot from the strip, the amount by that the pivot must be moved toward the strip until it is supported, the design coefficient of friction μ, and the maximum pushing force $-F_{tmin}$.
2. Calculate the distance $w=\mu y_i$ and the initial external force $F_i=F_{ti}/1$. The initial contact point is a distance w, parallel to the strip, from the center point V. A mirror contact point is on the other side of V. The cam surface may be flat between these points or bowed away from the strip.
3. Specify an external force F(y) and an external torque T(ψ). $F(y_i)$ must be $F_i$ and T(0) must be zero. After T becomes non-zero it should be positive, and should decrease as y approaches $y_i-\delta y$.
4. Initially, as the cam rotates to ψ, $R_Q^2=y_i^2+w^2$, $\tan(\theta_Q)=w/y_i$. $\phi=\psi-\theta_Q$, $y=R_Q \cos(\phi)$, $x=w+R_Q \sin(\phi)$, $F=F(y)$, $T=T(\psi)$, $F_t=(T/y)-F \tan(\phi)$, $T_{min}$, $=F\,y\,(\tan(\phi)-\mu)$, $T_{max}=F\,y\,(\tan(\phi)+\mu)$.
5. This initial motion can continue until $\tan(\phi)=T/(F\,y)-F_{tmin}/F$ or $\tan(\phi)=T/(F\,y)+\mu$, whichever comes first.
6. After the initial motion is ended, the cam surface is shaped so that tan(φ) is equal to or less than the smaller of $T/(F\,y)+\mu$ or $T/(F\,y)-F_{tmin}/F$. This is done by making $\tan(\phi)=-(1/R_Q)\, d\, R_Q/d\, \theta_Q=-d \log(R_Q)/d\theta_Q$. At a given A, the parameters $R_Q$, T, F, y, φ have been found. Then choose a new ψ and
7. Calculate the new T(ψ).
8. Estimate the new $\theta_Q$.
9. Calculate the new $\phi=\psi-\theta_Q$.
10. Calculate $(\tan(\phi)avg \cong (\tan((\phi_{old})+\tan(\phi_{new}))/2$.
11. Calculate the new $R_Q=R_{Qqold} \exp(-(\tan(\Omega))_{avg}\, \Delta\theta_Q)$.
12. Calculate the new $y=R_Q \cos(\phi)$.
13. Calculate the new F=F(y).
14. Check $\tan(\phi)=\min[T/(F\,y)+\mu,\ T/(F\,y)-F_{tmin}/F]$.
15. Repeat steps 8 to 14 until agreement.
16. If the new $\theta_Q$ is less than the old $\theta_Q$, set the new $\theta_Q$ and $R_Q$ equal to the old values and repeat steps 9, 12, and 13 (a discontinuity of slope occurs here).
17. Continue stepping v until $y=y_i-\delta y$. Then the cam pivot is resting on its support.
18. Calculate $F_N$ and the drag force $F_t=\mu_a F_N$ for further motion of the strip.
19. New relations F(y) and T(ψ) may be specified, and steps 4 to 18 repeated to improve the design.

Two design goals are to minimize the strip travel from lock to unlock, and to minimize the final drag force on the strip after unlocking.

Analysis of Torque

The torque is produced by two elastica strips mounted on either side at the top of the cam. The analysis will be for the one at the upper left that exerts the torque when the cam is rotated counter-clockwise. The other strip and its mounting are the mirror image of the one analyzed and the results are the same, with the necessary changes of sign.

In the following analysis some of the same symbols as above are used, but in most cases the meanings of the symbols are different.

The elastica has a fixed end at the upper left. If the elastica were undeformed (stress-free) it would be straight. In the locked position (ψ=0) the elastica is deformed so that its non-fixed end contacts the cam surface, but does not exert a torque about the cam pivot. After the cam has rotated a certain amount a projection on its surface contacts the end of the elastica, and additional rotation moves this end so that it remains in the same position relative to the cam.

| Parameters | |
|---|---|
| O | the center of rotation of the cam, |
| V | a point fixed in space. The line from O to V is perpendicular to the strip and directed away from the strip, |
| F | the fixed end of the elastica, |
| $R_f$ | the length of the line OF, |
| $\phi_f$ | the angle between OV and OF, |
| E | the end of the elastica in contact with the cam, |
| $\phi_e$ | the angle between OV and OE, |
| $\phi_{ei}$ | the value of $\phi_e$ in the locked position, |
| $R_e$ | the distance from the cam pivot O to point E, |
| $\psi_T$ | the cam rotation, from the locked position, at the point where the cam begins to move the elastica further, |
| $E_u$ | the free end of the elastica if the elastica were unstressed, |
| $\phi_u$ | the angle between $FE_u$ and a line parallel to OV, |
| P | any point along the elastica, |
| s | the distance along the elastica from F to P, |
| x | the distance FP projected along $FE_u$, |
| y | the distance of FP from the line $FE_u$, |
| $x_e$, $y_e$ | the values of x and y at E, |
| θ | the angle between the tangent to the elastica at P and the line $FE_u$, |
| F | the (constant along the elastica) force on any elastica cross-section, |
| $F_x$, $F_y$, | the components of F along and perpendicular to $FE_u$, |
| M | the moment on a cross-section of the elastica, |
| L | the length of the elastica, |
| EI | the product of the elastica Young's modulus and section area-moment, |

Note that when v is greater than $\psi_T \phi_c = \phi_{ei} + (\psi - \psi_T)$ and that $\psi_T$ generally will be less than $\phi_{ei}$.

Equations $$\frac{d\theta}{ds} = \frac{M}{EI} \text{ (From Strength of Materials)} \tag{1}$$

$$\frac{dx}{ds} = \cos\theta,\ \frac{dy}{ds} = \sin\theta \text{ (Geometry)} \tag{2}$$

$$M = M_f + F_x y - F_y x \tag{3}$$

(Moment balance about point F; $M_f$ is the moment at F)

$$\frac{dM}{ds} = EI\frac{d^2\theta}{ds^2} = F_x\sin\theta - F_y\cos\theta \tag{4}$$

(Differentiation of 1 and 3 and Use of 2)

$$\text{At F, } s=x=y=\theta=0. \text{ At E, } M=0,\ s=L,\ x=X_e,\ y=y_e \text{ (Boundary conditions)} \tag{5}$$

The following solutions to differential equation 4 with the boundary conditions θ=0 at s=0 and M=0 at s=L may be verified by direct substitution:

$$\sin\theta = -2\sqrt{m(1-m)}\,\frac{F_x}{F}cdnd - \frac{F_y}{F}(1-2mcd^2) \tag{6}$$

$$\cos\theta = 2\sqrt{m(1-m)}\,\frac{F_y}{F}cdnd - \frac{F_x}{F}(1-2mcd^2) \tag{7}$$

$$M = \sqrt{FEI}\,2\sqrt{m(1-m)}\,sd \tag{8}$$

-continued $$\frac{F_x}{F} = 2mcd_o^2 - 1,\ \frac{F_y}{F} = 2\sqrt{m(1-m)}\,cd_o nd_o \tag{9}$$

In these equations, cd stands for the elliptic function cd(w|m), $cd_o$ for cd($w_o$|m), nd for the elliptic function nd(w|m), $nd_o$ for nd($w_o$|m), sd for the elliptic function sd(w|m). m is the parameter, a constant of integration, and w and $w_o$ are $$w = \sqrt{\frac{F}{EI}}\,(L-s),\ w_o = \sqrt{\frac{F}{EI}}\,L \tag{10}$$

Equations 6 and 7 may be integrated to get $$x = \sqrt{\frac{EI}{F}}\left[-2\sqrt{m(1-m)}\,\frac{F_y}{F}sd + \frac{F_x}{F}(2E - w - 2msncd)\right] + const \tag{11}$$

$$y = \sqrt{\frac{EI}{F}}\left[2\sqrt{m(1-m)}\,\frac{F_x}{F}sd + \frac{F_y}{F}(2E - w - 2msncd)\right] + const \tag{12}$$

Here E stands for the elliptic integral E(w|m) and sn for the elliptic function sn(w|m). The constants in 11 and 12 may be found by requiring that x and y vanish at s=0. Then the following relations are found for x and y at the end point E:

$$\frac{x_e}{L} = \frac{1}{w_o}[2msn_o cd_o - (1-2mcd_o^2)(w_o - 2E_o)] \tag{13}$$

$$\frac{y_e}{L} = \frac{2\sqrt{m(1-m)}}{w_o}[sd_o + cd_o nd_o(w_o - 2E_o)] \tag{14}$$

In these equations $E_o$ stands for E($w_o$|m), $sn_o$ for sn($w_o$|m), and $sd_o$ for sd($w_o$|m).

From the geometry of the system the end coordinates are $$x_e = R_f\cos(\phi_d - \phi_u) - R_e\cos(\phi_e - \phi_u) \tag{15}$$

$$y_e = R_f\sin(\phi_f - \phi_u) - R_e\sin(\phi_e - \phi_u) \tag{16}$$

Now when $x_e$ and $y_e$ are calculated, equations 13 and 14 can be used to find $w_o$ and m. Then F=EI $(w_o/L)^2$ and equations 9 can be used to find $F_x$ and $F_y$.

When $F_x$ and $F_y$ are determined the clockwise torque T about the pivot that the elastica exerts on the cam is given by $$T = R_e[F_x\sin(\phi_e - \phi_u) - F_y\cos(\phi_e - \phi_u)] \tag{17}$$

Procedure

1. Specify $R_f$, $\phi_f$, $\phi_u$, $R_e$, $\psi_T$, $(\phi_{ei} - \psi_T)$, EI.
2. Calculate $\phi_{ei}$ and $F_y/F_x = \sin(\phi_{ei} - \phi_u)$ (equation 17 with initial T=0).
3. Divide equations 9 and set equal to $\sin(\phi_{ei} - \phi_u)$ to get a relation between m and $w_o$.
4. Calculate initial $x_e$ and $y_e$ from equations 15 and 16.
5. Divide equations 13 and 14 and set to $x_e/y_e$ to get another relation between m and $w_o$.
6. Solve the two relations to get the initial m and $w_o$.
7. From equation 13 and $x_e$ calculate L.

Now for any $\psi$

8. If $\psi<\psi_T$ T=0. Else $\phi_e=\psi+(\phi_{ei}-\psi_T)$.
9. From equations 15, 16, and L calculate $x_e/L$ and $y_e/L$.
10. Use equations 13 and 14 to determine m and $w_o$ for this $\psi$.
11. Use equations 9 to calculate $F_x$ and $F_y$.
12. Use equation 17 to calculate the torque T for this $\psi$.

APPENDIX 2

Analysis of Door-Check Device (FIG. 17)

The current door check device shown in FIG. 17 may be pictured as follows: it has a horizontal strip that moves with the door, while the remainder of the device is fixed to the frame of the vehicle. The bottom of the strip rubs against some backing with a coefficient of friction of PB. The top of the strip has a prong bearing on it; at its upper end the prong rotates about a pin, and the length of the prong from its center of rotation to its contact point with the strip is L. The prong makes an angle $\theta$ with the normal to the strip. The coefficient of friction of the prong with the strip is $\mu_T$, and this is always greater than or equal to $\mu_{Tm}$. The pin cannot move horizontally, and moves vertically in a slot. It is acted upon by a spring that exerts a downward force on it. In the locked-up configuration, the prong is normal to the strip ($\theta$ is zero). When the pin moves downward a distance $\delta_P$ from the locked-up position, it is supported by the end of its slot and the spring force is no longer transmitted to the strip.

For this analysis, the strip moves a distance x to the right from its locked-up configuration. Motion to the left is completely symmetric to this.

The compressive force in the spring is $F_S$. If $F_{S0}$ is its value in the locked-up configuration and the spring rate of the spring is $k_S$, then $F_S=F_{S0}-k_SL(1-\cos\theta)$, where $L(1-\cos\theta)$ is the downward motion of the pin from its locked-up configuration. Two more forces are introduced: $F_N$ is the normal force downward on the strip from the prong, and $F_T$ is the horizontal force to the left on the strip from the prong. In addition, through some mechanism, a clockwise torque T is acting on the prong at the pin. While the pin is above the bottom of its slot $F_N$ will equal $F_S$. A moment balance on the prong leads to $T=F_NL\sin\theta+F_TL\cos\theta$. The horizontal force needed to move the strip is $F_{str}=F_T+\mu_BF_N$.

In the initial motion from the locked up position the prong is required not to slip on the strip. This requires that $|F_T|\leqq\mu_{Tm}F_N$ and so $F_NL(\sin\theta\mu_{Tm}\cos\theta)\leqq T\leqq F_NL(\sin\theta+\mu_{Tm}\cos\theta)$. During this motion $x=L\sin\theta$, $F_N=F_S=F_{S0}-k_SL(1-\cos\theta)$, $F_T=T/(L\cos\theta)-F_N\tan\theta$, and T will be some function of $\theta$ and, perhaps, $F_S$. When L, $k_S$, $F_{S0}$, and $\mu_B$ are known, then for any x successively $\theta$, $F_S$, $F_N$, T, $F_T$ and then $F_{str}$ can be calculated. In the locked-up configuration where x and $\theta$ are zero, by symmetry T should be zero and $F_{str}=\mu_BF_{S0}$.

When the pin has moved to the bottom of its slot, $\theta$ has reached its maximum value, $\theta_D$, where $\cos\theta_D=1-\delta_p/L$, and $x=x_D=L\sin\theta_D=\sqrt{\delta_p(2L-\delta_p)}$. Further motion of the strip requires dragging it under the prong, and then $$F_T=\mu_TF_N,\ F_N=F_{N,drag}=\frac{T_D}{L(\sin\theta_D+\mu_T\cos\theta_D)},$$

where $T_D$ is the value of the torque when the pin has bottomed out and $\theta$ is $\theta_D$, and $F_{str}=F_{str,drag}=(\mu_T+\mu_B)F_{N,drag}$. Just before the pin bottoms out the spring force and thus $F_N$ is $F_N=F_S=F_{S0}-k_S\delta_p$, and the torque T must be at least $T\geqq(F_{S0}-k_S\delta_p)L(\sin\theta_D-\mu_{Tm}\cos\theta_D)$. If the torque does not change after the pin bottoms out and $\theta$ reaches $\theta_D$, then $T_D$ will satisfy the same inequality, and the force needed to move the strip further will be $$F_{str,drag}\geq(\mu_T+\mu_B)(F_{S0}-k_S\delta_P)\frac{\sin\theta_D-\mu_{Tm}\cos\theta_D}{\sin\theta_D+\mu_T\cos\theta_D},\text{ and}$$

$$\frac{F_{str,drag}}{F_{str,lock}}\geq\left(1+\frac{\mu_T}{\mu_B}\right)\left(1-\frac{k_S\delta_P}{F_{S0}}\right)\frac{\sin\theta_D-\mu_{Tm}\cos\theta_D}{\sin\theta_D+\mu_T\cos\theta_D}.$$

Note that if $T_{door}$ is the torque on the door needed to move it and if $r_{DC}$ is the horizontal distance from the center of the force $F_N$ to the center of rotation of the door hinge, then $T_{door}=r_{DC}F_{str}$. Thus, if $T_{door}$ is specified for the locked position and for the continuously moving configuration, and if $r_{DC}$ is known, then the required $F_{str}$ for these configurations can be determined.

Example: suppose that L=0.5 inches and $\delta_P$=0.1 inches. Then $\theta_D$=36.87 degrees and $x_D$=0.30 inches. If the required locked-up door torque is $T_{door}$=400 inch-pounds, $r_{DC}$=2 inches, and $\mu_B$=0.4, then the locked-up strip force must be $F_{str,lock}$=400/2=200 pounds, and the locked-up spring force must be $F_{S0}$=200/0.4=500 pounds. Suppose that $\mu_T$=0.2 and $\mu_{Tm}$=0.1. Then $$\frac{F_{str,drag}}{F_{str,lock}}\geq1.0263\left(1-\frac{k_S\delta_P}{F_{S0}}\right),$$

and if this ratio should be, say, about 0.2, then the spring force just before the pin bottoms out must be only about 20% of the initial locked-up spring force.

| Parameters: | |
|---|---|
| $F_N$ | normal force downward on strip from prong, |
| $F_S$ | compressive force in spring, |
| $F_{S0}$ | value of $F_S$ in locked-up configuration, |
| $F_{str}$ | horizontal force needed to move the strip, |
| $F_T$ | horizontal force to left on strip from prong, |
| $k_S$ | spring rate of spring, |
| L | length of prong from pin to strip, |
| T | clockwise torque on prong at the pin, |
| $T_D$ | the value of T when $\theta$ is $\theta_D$ and the pin has bottomed out, |
| x | horizontal motion of strip, to right from locked-up configuration, |
| $x_D$ | value of x at which the prong begins to slip on the strip, |
| $\delta_P$ | maximum travel of pin in its slot, down from locked-up config, |
| $\theta$ | angle between prong and normal of strip, |
| $\theta_D$ | maximum value of $\theta$, where the prong begins to slip, |
| $\mu_B$ | coefficient of friction between strip and backing below it, |
| $\mu_T$ | coefficient of friction between prong and strip, and |
| $\mu_{Tm}$ | minimum value of $\mu_T$. |

The invention claimed is:

1. A vehicle, comprising:

a door frame alongside a position in a passenger compartment of the vehicle normally occupied by an occupant of the vehicle;

a door having a first, closed position arranged in said door frame and a second, fully open position outside of said door frame;

a door check mechanism which enables said door to be moved from said first position to said second position and from said first position to any one of a plurality of different open positions between said first position and said second position, said door check mechanism comprising a motor arranged to move said door from said first position to said second position and from said first position to any of the plurality of different open positions between said first position and said second position before said door reaches said second position;

control means for controlling said motor to initiate an opening movement of said door from said first position and stop said opening movement of said door before said door reaches said second position when said door is in any one of the different open positions between said first position and said second position and maintain said door in said stopped position in the absence of applied force to hold said door in said stopped position;

lever means coupled to said door; and rotation means coupled to said motor and said lever means for enabling said motor to cause said lever means to exert a force on said door in order to cause said door to open or close, said rotation means comprising a gear engaging with said motor and a shaft arranged to be rotated by said gear, said lever means comprising lever arms coupled to said shaft and arranged to exert a force on said door upon rotation of said shaft in order to cause said door to open and close.

2. The vehicle of claim 1, wherein said control means comprise a pressure detecting sensor arranged to detect applied pressure and a processor coupled to said pressure detecting sensor to direct said motor to move or cease the opening movement of said door based on the detected pressure.

3. The vehicle of claim 2, wherein said motor is arranged to move said door to any one of a plurality of different laterally open positions in which a space between a first lateral edge of said door and an edge of said door frame toward which said first lateral edge of said door moves during closing movement of said door is varied, the space enabling access into and from the passenger compartment when said door is in an open position, said door having a second lateral edge on an opposite side of said door from said first lateral edge, said sensor being arranged at said second lateral edge of said door and having a pressure sensitive surface oriented in an opening direction in which said door moves laterally during the opening movement of said door.

4. The vehicle of claim 1, wherein said motor is arranged to move said door during its opening movement from said first position to any one of a plurality of different laterally open positions in which a space between a lateral edge of said door and an edge of said door frame against which said lateral edge of said door is positioned when said door is situated in said door frame is varied, the space enabling access into and from the passenger compartment when said door is in said second position.

5. The vehicle of claim 1, further comprising guide means for guiding movement of said door as said lever means exert the force on said door causing the front edge of said door to initially move outward and then forward.

6. The vehicle of claim 5, wherein said guide means comprise a track arranged in said door frame, said lever arms being arranged to exert a force on said door upon rotation of said shaft in order to cause a front edge of said door to initially move outward and then forward as a rear edge of said door moves in said track.

7. The vehicle of claim 2, wherein said control means are arranged to control said motor to initiate a closing movement of said door from an open position to said first position, said control means comprising an additional pressure detecting sensor arranged to detect applied pressure, said processor being coupled to said additional pressure detecting sensor and directing said motor to cease the closing movement of said door based on the detected pressure.

8. The vehicle of claim 3, wherein said control means are arranged to control said motor to initiate a closing movement of said door from an open position to said first position, said control means comprising an additional pressure detecting sensor arranged to detect applied pressure, said processor being coupled to said additional pressure detecting sensor and directing said motor to cease the closing movement of said door based on the detected pressure, said additional pressure sensor being arranged on said first lateral side of said door.

9. The vehicle of claim 4, said control means comprising a sensor arranged to detect an object in proximity to or in contact with said lateral edge of said door and a processor coupled to said sensor to direct said motor to cease the opening movement of said door based on the detection of an object in proximity to or in contact with said lateral edge of said door.

10. The vehicle of claim 9, wherein said sensor is a pressure detecting sensor arranged at said lateral edge of said door and having a pressure sensitive surface oriented in an opening direction in which said door moves laterally during the opening movement of said door, said pressure detecting sensor being arranged to detect contact between an object and said pressure sensitive surface.

11. A method for enabling a door to be opened to any one of a plurality of different positions, comprising:

mounting the door in a door frame;

coupling a motor to the door via a shaft and a lever mechanism, the lever mechanism including lever arms coupled to the shaft and arranged to exert a force on the door upon rotation of the shaft in order to cause the door to open and close;

actuating the motor to move the door from a closed position in the door frame into any one of a plurality of different open positions; and stopping the opening movement of the door when the door is positioned in any one of the plurality of different open positions and maintaining the door in the stopped position in the absence of applied force to hold the door in the stopped position; and enabling the motor to cause the lever mechanism to exert a force on the door upon rotation of the shaft in order to cause the door to open and close, the step of coupling the motor to the door comprising engaging a gear with the motor and arranging the shaft to be rotated by the gear.

12. The method of claim 11, further comprising arranging a pressure detecting sensor to detect applied pressure, the opening movement of the door being stopped by applying pressure to the sensor.

13. The method of claim 12, wherein the door is mounted such that the door moves in a lateral direction alongside the door frame during the opening movement of the door, the motor being actuated to move the door from the closed position into any one of a plurality of different laterally open positions in which a space between a first lateral edge of the door and an edge of the door frame toward which the first lateral edge of the door moves during closing movement of the door is varied, the space enabling access through the door frame when the door is in an open position, the door having a second lateral edge on an opposite side of the door from the first lateral edge, the sensor being arranged at the second lateral edge of the door and having a pressure sensitive surface oriented in an opening direction in which the door moves laterally during the opening movement of the door.

14. The method of claim 11, wherein the door is mounted such that the door moves in a lateral direction alongside the door frame during the opening movement of the door, the motor being actuated to move the door from the closed position into any one of a plurality of different laterally open positions in which a space between a lateral edge of the door and an edge of the door frame against which the lateral edge of the door is positioned when the door is situated in the door frame is varied, the space enabling access through the door frame when the door is in an open position.

15. The method of claim 11, further comprising guiding movement of the door.

16. The method of claim 15, wherein the movement of the door is guided by a track arranged in the door frame and the lever arms shaft and to exert a force on the door upon rotation of the shaft in order to cause a front edge of the door to initially move outward and then forward as a rear edge of the door moves in the track.

17. The method of claim 11, wherein the motor is actuated to move the door from the closed position to any one of a plurality of different laterally open positions in which a space between a first lateral edge of the door and an edge of the door frame toward which the first lateral edge of the door moves during closing movement of the door is varied, the space enabling access into and from the passenger compartment when the door is in an open position, the door having a second lateral edge on an opposite side of the door from the first lateral edge, the method further comprising:

arranging a sensor to detect an object in proximity to or in contact with the second lateral edge of the door; and stopping the opening movement of the door when an object in proximity to or in contact with the second lateral edge of the door is detected.

18. The method of claim 17, wherein the sensor is a pressure detecting sensor arranged at the second lateral edge of the door and having a pressure sensitive surface oriented in an opening direction in which the door moves laterally during the opening movement of the door, the pressure detecting sensor being arranged to detect contact between an object and the pressure sensitive surface.

19. The method of claim 11, further comprising arranging the door frame alongside a position in the passenger compartment normally occupied by an occupant of a front seat of the vehicle.

20. A vehicle, comprising:

a door frame;

a door mounted in said door frame;

a door check mechanism for enabling said door to be moved in an opening direction from a closed position in said door frame to any one of a plurality of different open positions;

a motor coupled to said door and arranged to move said door from the closed position to any of the open positions;

a pressure sensor arranged on the door and having a pressure sensitive surface oriented in the direction of opening of said door whereby pressure is applied to the pressure sensitive surface when a side of said door which is a leading side of said door during opening movement of said door encounters an obstacle to the opening movement of said door;

a processor coupled to said sensor and directing said motor to stop the opening movement of said door and maintain said door in its stopped position when pressure above a threshold is applied to said pressure sensitive surface of said pressure sensor;

lever means coupled to said door; and rotation means coupled to said motor and said lever means for enabling said motor to cause said lever means to exert a force on said door in order to cause said door to open and close, said rotation means comprising a gear engaging with said motor and a shaft arranged to be rotated by said gear, said lever means comprising lever arms coupled to said shaft and arranged to exert a force on said door upon rotation of said shaft in order to cause said door to open and close.

21. The vehicle of claim 20, further comprising a front seat and wherein said door frame is situated alongside a position in a passenger compartment of the vehicle normally occupied by an occupant of said front seat.

22. The vehicle of claim 21, wherein said motor is arranged to move said door from the closed position to any of a plurality of different laterally open positions in which a space between a first lateral side of said door and an edge of said door frame toward which said first lateral side of said door moves during closing movement of said door is varied, the space enabling access through said door frame when said door is in an open position, said pressure sensor being arranged on a second lateral side of said door opposite said first lateral side.

23. A vehicle, comprising:

a door frame;

a door mounted in said door frame;

a door check mechanism for enabling said door to be moved from a closed position in said door frame to any one of a plurality of different open positions;

a motor coupled to said door and arranged to move said door from the closed position to any of the open positions in which a space between a first lateral edge of said door and an edge of said door frame toward which said first lateral edge of said door moves during closing movement of said door is varied, the space enabling access through said door frame when said door is in an open position;

a sensor arranged to detect an object in proximity to or in contact with a second lateral edge of said door on an opposite side of said door from said first lateral edge;

a processor coupled to said sensor and arranged to direct said motor to cease the opening movement of said door based on the detection of an object in proximity to or in contact with said second lateral edge of said door;

lever means coupled to said door; and rotation means coupled to said motor and said lever means for enabling said motor to cause said lever means to exert a force on said door in order to cause said door to open and close, said rotation means comprising a gear engaging with said motor and a shaft arranged to be rotated by said gear, said lever means comprising lever arms coupled to said shaft and arranged to exert a force on said door upon rotation of said shaft in order to cause said door to open and close.

24. The vehicle of claim 23, further comprising a front seat and wherein said door frame is situated alongside a position in a passenger compartment of the vehicle normally occupied by an occupant of said front seat.

25. A method for enabling a door to be opened to any one of a plurality of different positions, comprising:

coupling a motor to the door via a shaft and a lever mechanism, the lever mechanism including lever arms coupled to the shaft and arranged to exert a force on the door upon rotation of the shaft in order to cause the door to open and close;

arranging the motor to move the door from the closed position to any of a plurality of different laterally open positions in which a space between a first lateral edge of the door and an edge of the door frame toward which the first lateral edge of the door moves during closing movement of the door is varied, the space enabling access through the door frame when the door is in an open position;

actuating the motor to move the door from a closed position into an open position;

arranging a sensor to detect an object in proximity to or in contact with a second lateral edge of the door on an opposite side of the door from the first lateral edge;

directing the motor to stop the opening movement of the door and maintain the door in the stopped position when an object in proximity to or in contact with the second lateral edge of the door is detected by the sensor; and enabling the motor to cause the lever mechanism to exert a force on the door upon rotation of the shaft in order to cause the door to open and close, the step of coupling the motor to the door comprising engaging a gear with the motor and arranging the shaft to be rotated by the gear.

26. The method of claim 25, wherein the step of arranging the sensor comprises arranging a pressure detecting sensor at the second lateral edge of the door and which has a pressure sensitive surface oriented in an opening direction in which the door moves laterally during the opening movement of the door, the pressure detecting sensor being arranged to detect contact between an object and the pressure sensitive surface, the motor being directed to stop the opening movement of the door and maintain the door in its stopped position when pressure above a threshold is applied to the pressure sensitive surface of the pressure sensor.

27. The method of claim 25, further comprising arranging the door frame alongside a position in a passenger compartment of the vehicle normally occupied by an occupant of a front seat of the vehicle.

28. The vehicle of claim 1, further comprising a front seat, said door frame being arranged alongside a position in the passenger compartment normally occupied by an occupant of said front seat.

* * * * *

UNITED STATES PATENT AND TRADEMARK OFFICE

CERTIFICATE OF CORRECTION

PATENT NO. : 7,438,346 B1
APPLICATION NO. : 11/230150
DATED : October 21, 2008
INVENTOR(S) : David S. Breed It is certified that error appears in the above-identified patent and that said Letters Patent is hereby corrected as shown below:

Column 41, line 15, delete “shaft and to”

Signed and Sealed this

Eleventh Day of August, 2009

David J. Kappos
*Director of the United States Patent and Trademark Office*